US012513215B2

(12) United States Patent
Howard

(10) Patent No.: US 12,513,215 B2
(45) Date of Patent: Dec. 30, 2025

(54) INTELLIGENT REASONING FRAMEWORK FOR USER INTENT EXTRACTION

(71) Applicant: Genesis Intelligence, LLC, Jacksonville, FL (US)

(72) Inventor: Newton Howard, Washington, DC (US)

(73) Assignee: Genesis Intelligence, LLC, Washington, DC (US)

( * ) Notice: Subject to any disclaimer, the term of this patent is extended or adjusted under 35 U.S.C. 154(b) by 0 days.

(21) Appl. No.: 18/167,482

(22) Filed: Feb. 10, 2023

(65) Prior Publication Data

US 2023/0188612 A1    Jun. 15, 2023

Related U.S. Application Data

(63) Continuation of application No. 16/520,673, filed on Jul. 24, 2019, now Pat. No. 11,588,902.

(Continued)

(51) Int. Cl.
*H04L 67/306* (2022.01)
*G06F 16/9535* (2019.01)
(Continued)

(52) U.S. Cl.
CPC ........ *H04L 67/306* (2013.01); *G06F 16/9535* (2019.01); *G06N 5/025* (2013.01);
(Continued)

(58) Field of Classification Search
CPC . H04L 67/306; H04L 67/535; H04L 12/2829; G06N 20/00; G06N 5/025; G06F 16/9535; G08B 19/00
(Continued)

(56) References Cited

U.S. PATENT DOCUMENTS 6,745,168 B1    6/2004  Enomoto
8,380,902 B2 *  2/2013  Howard ................. G06Q 10/06
                                                         705/7.15
(Continued)

OTHER PUBLICATIONS

Cambria et al., Sentic blending: Scalable multimodal fusion for the continuous interpretation of semantics and sentics, 2013 IEEE Symposium on Computational Intelligence for Human-like Intelligence (CIHLI), Singapore, 2013, pp. 108-117 (Year: 2013).*

(Continued)

*Primary Examiner* — Nicholas R Taylor
*Assistant Examiner* — Chong G Kim
(74) *Attorney, Agent, or Firm* — NEO IP

(57) ABSTRACT

Embodiments of the present systems and methods may provide an intelligent systems framework for analysis of user-generated content from various capture points to determine user intent. For example, a method may be implemented in a computer system comprising a processor, memory accessible by the processor, and computer program instructions stored in the memory and executable by the processor, the method may comprise receiving, at the computer system, data relating to a plurality of aspects of at least one person, including data from at least one of physical or physiological sensors and communicatively connected devices, extracting, at the computer system, from the received data, features relevant to events relating to at least one person, extracting, at the computer system, at least one intent of at least one event relating to at least one person, and performing, at the computer system, an action based on the extracted at least one intent.

15 Claims, 12 Drawing Sheets

Related U.S. Application Data

(60) Provisional application No. 62/702,815, filed on Jul. 24, 2018.

(51) Int. Cl.
| | |
|---|---|
| *G06N 5/025* | (2023.01) |
| *G06N 20/00* | (2019.01) |
| *G08B 19/00* | (2006.01) |
| *H04L 12/28* | (2006.01) |
| *H04L 67/50* | (2022.01) |

(52) U.S. Cl.
CPC ............. *G06N 20/00* (2019.01); *G08B 19/00* (2013.01); *H04L 12/2829* (2013.01); *H04L 67/535* (2022.05)

(58) Field of Classification Search
USPC .......................................................... 707/734
See application file for complete search history.

(56) References Cited

U.S. PATENT DOCUMENTS

| | | | | |
|---|---|---|---|---|
| 8,606,735 | B2 | 12/2013 | Cho | |
| 9,124,694 | B2 | 9/2015 | Monegan | |
| 9,652,797 | B2 | 5/2017 | Vijayaraghavan | |
| 10,482,521 | B2* | 11/2019 | Vijayaraghavan | ........................... G06Q 30/0201 |
| 10,846,601 | B1* | 11/2020 | Howard | ................... G06N 3/08 |
| 10,990,645 | B1* | 4/2021 | Shi | .......................... G06N 3/045 |
| 2008/0155147 | A1* | 6/2008 | Howard | ................. G06Q 10/06 710/306 |
| 2009/0037832 | A1 | 2/2009 | Falchuk | |
| 2010/0090835 | A1 | 4/2010 | Liu | |
| 2012/0016678 | A1* | 1/2012 | Gruber | ................ G06F 16/3344 704/E21.001 |
| 2014/0079195 | A1 | 3/2014 | Srivastava | |
| 2015/0100943 | A1 | 4/2015 | Gabel et al. | |
| 2015/0256675 | A1* | 9/2015 | Sri | ...................... H04M 3/5183 379/265.09 |
| 2015/0269150 | A1 | 9/2015 | Carper | |
| 2015/0356405 | A1 | 12/2015 | Sanchez | |
| 2016/0042359 | A1* | 2/2016 | Singh | ...................... G06F 40/30 704/2 |
| 2017/0199866 | A1 | 7/2017 | Gunaratna | |
| 2018/0012163 | A1* | 1/2018 | Smith | ................... G06F 16/243 |
| 2018/0039745 | A1 | 2/2018 | Chevalier et al. | |
| 2018/0114527 | A1 | 4/2018 | Zilotti | |
| 2018/0211175 | A1 | 7/2018 | Mendels | |
| 2019/0155577 | A1 | 5/2019 | Prabha | |
| 2019/0215290 | A1 | 7/2019 | Kozloski | |
| 2019/0251626 | A1 | 8/2019 | Jezewski | |
| 2019/0332647 | A1 | 10/2019 | Rincon Opden Bosch | |
| 2021/0256345 | A1* | 8/2021 | Mars | ...................... G06N 20/20 |
| 2025/0165995 | A1* | 5/2025 | Hamedi | ............... G06V 10/766 |

OTHER PUBLICATIONS

Howard et al., Intention awareness: improving upon situation awareness in human-centric environments. Hum. Cent. Comput. Inf. Sci. 3, 9 (2013) (Year: 2013).*

Howard et al., Application of intention awareness and sentic computing for sensemaking in joint-cognitive systems, 2013 IEEE Symposium on Intelligent Agents (IA), Singapore, 2013, pp. 1-4 (Year: 2013).*

Cambria et al., Semantic Multidimensional Scaling for Open-Domain Sentiment Analysis, IEEE Intelligent Systems, vol. 29, No. 02, pp. 44-51, 2014 (Year: 2014).*

Ethan Fast, Binbin Chen, Michael S. Bernstein, "Empath: Understanding Topic Signals in Large-Scale Text", Chi: ACM Conference on Human Factors in Computing Systems May 2016, arXiv:1602.06979, https://doi.org/10.48550/arXiv.1602.06979.

Karol Kurach, Sylvain Gelly, Michal Jastrzebski, Philip Haeusser, Olivier Teytaud, Damien Vincent, Olivier Bousquet, "Better Text Understanding Through Image-To-Text Transfer", May 2017, arXiv:1705.08386, https://doi.org/10.48550/arXiv.1705.08386.

Hema Swetha Koppula, Rudhir Gupta and Ashutosh Saxena, "Learning human activities and object affordances from RGB-D videos", The International Journal of Robotics Research, May 2013, arXiv:1210.1207, https://doi.org/10.48550/arXiv.1210.1207.

Koppula, H.S. & Saxena, A .. (2013). "Learning spatio-temporal structure from RGB-D videos for human activity detection and anticipation." 30th International Conference on Machine Learning, ICML Jan. 2013. 1829-1837.

Ng, Joe & Hausknecht, Matthew & Vijayanarasimhan, Sudheendra & Vinyals, Oriol & Monga, Rajat & Toderici, George. (Jun. 2015). "Beyond short snippets: Deep networks for video classification". 4694-4702. 10.1109/ CVPR.2015.7299101.

Kuehne, H et al. "Hmdb: A Large Video Database for Human Motion Recognition." IEEE, 2011. 2556-2563. Web. Apr. 11, 2012. @ 2012 Institute of Electrical and Electronics Engineers.

Tran, Du & Bourdev, Lubomir & Fergus, Rob & Torresani, Lorenzo & Paluri, Manohar. (Dec. 2015). Learning Spatiotemporal Features with 3D Convolutional Networks. 4489-4497. 10.1109/ICCV.2015. 510.

Xiaolong Wang, Ali Farhadi and Abhinav Gupta, "Actions ~ Transformations", Proc. of IEEE Conference on Computer Vision and Pattern Recognition (CVPR), 2016.

N. Howard, "Application of intention awareness and sen tic computing for sensemaking in joint-cognitive systems," 2013 IEEE Symposium on Intelligent Agents (IA), 2013, pp. 1-4 (Year: 2013).

Howard, N., Cambria, E. Intention awareness: improving upon situation awareness in human-centric environments. Hum. Cent. Comput. Inf. Sci. 3, 9 (2013) (Year: 2013).

Written Opinion of the International Searching Authority dated Oct. 9, 2019, received in International application No. PCT/US19/43168 (3 pages).

Notification of Transmittal of the International Search Report dated Oct. 9, 2019, received in International application No. PCT/US19/43168 (4 pages).

* cited by examiner

INTELLIGENT REASONING FRAMEWORK FOR USER INTENT EXTRACTION

CROSS-REFERENCE TO RELATED APPLICATIONS

This application is a continuation of U.S. patent application Ser. No. 16/520,673, filed Jul. 24, 2019, now U.S. patent Ser. No. 11/588,902, issued Feb. 21, 2023, which claims the benefit of U.S. Provisional Application No. 62/702,815, filed Jul. 24, 2018, the contents of all of which are incorporated herein in their entirety.

BACKGROUND

The present invention relates to techniques that provide an intelligent systems framework that may facilitate the analysis of user-generated content from various capture points to determine user intent.

Intelligent systems have been used in multiple scenarios and proved as efficacious instruments for determining results where uncertainties and unknown situations are dominant. User intent identification becomes significantly important with the increase in technology, the expansion of digital economies and products and diversity in user preferences, which positions a user as a key actor in a system of decisions. Interpretation of such decisions or intent inferring may lead to a more open, organized, and optimized society where products and services can be easily adapted and offered based on a forecast of user intent and preferences (recommendation system). Likewise, crime and social decay may be prevented using data and intent analysis (prevention system), and the common good may be pursued by optimizing every valuable aspect of user's dynamic lifestyle (lifestyle optimization system). These goals may be achieved both at the level of the community and of the individual.

In order to attain these goals, a need arises for techniques that may facilitate the analysis of user-generated content from various capture points to determine user intent.

SUMMARY

Embodiments of the present systems and methods may provide an intelligent systems framework that may facilitate the analysis of user-generated content from various capture points to determine user intent. The system may be supported by an ensemble of ontologies that define concepts and relationships for user intentions, and represents the state of the world as is. Given the centrality of intent in human behavior and lifestyle, the resulting framework may focus at its core on facilitating the determination of user intentions based on active reasoning and in-transit data analysis.

For example, in an embodiment, a method may be implemented in a computer system comprising a processor, memory accessible by the processor, and computer program instructions stored in the memory and executable by the processor, the method may comprise receiving, at the computer system, data relating to a plurality of aspects of at least one person, including data from at least one of physical or physiological sensors and communicatively connected devices, extracting, at the computer system, from the received data, features relevant to events relating to at least one person, extracting, at the computer system, at least one intent of at least one event relating to at least one person, and performing, at the computer system, an action based on the extracted at least one intent.

In embodiments, the data relating to a plurality of aspects of at least one person may comprise live data retrieved from a plurality of capture points that at least one person is exposed to and interacts with, the communicatively connected device may comprise at least one of a microphone, room camera, fridge camera, smart mobile, smart refrigerator, smart watch, smart fire alarm, smart door lock, smart bicycle, medical sensor, fitness tracker, smart security system, voice controller, dash button, doorbell cam, mobile robot, smart light switch, and air quality monitor, the physical and physiological sensor comprises at least one of an audio sensor, video sensor, electro-encephalogram sensor, electro-cardiogram sensor, heart rate sensor, breathing rate sensor, blood pressure sensor, body temperature sensor, head movement sensor, body posture sensor, and blood oxygenation level sensor, humidity sensor, biometric sensor, and the data may further comprise at least one of browsing history, bookmarks, browsing behavior, time spent on particular web pages, location history, calendar with past and upcoming events, social media activity, posts, social network graph, text, audio, video, social media content, chat, SMS, email, medical visits, current diseases, medical treatments, real-time movements, breathing, cardiac frequency, and sleep patterns. The features relevant to events relating to at least one person may be extracted using artificial intelligence and machine learning models trained using data relating to a plurality of aspects of at least one person, wherein data relating to actions that are highly-specific predictors for particular intents are tagged. At least one intent of at least one event relating to at least one person may be extracted using ontologies data relating to subject areas that shows the properties and the relations between the subject area, and ontologies methodology may be used to create a supporting framework for intention query by defining concepts, sub-concepts, relationships, and expressions/intentions based on aggregation of multiple concepts. The extracted intent may comprise at least one of a strategic intent comprising that which the at least one person seeks to achieve over a long-term in a domain, and a tactical intent comprising that which the at least one person seeks to achieve of a short-term. The physical action may comprise at least one of generating an alarm, providing information or suggestions, and providing narrativization of events.

In an embodiment, a system may comprise a processor, memory accessible by the processor, and computer program instructions stored in the memory and executable by the processor to perform receiving data relating to a plurality of aspects of at least one person, including data from at least one of physical or physiological sensors and communicatively connected devices, extracting from the received data, features relevant to events relating to at least one person, extracting at least one intent of at least one event relating to at least one person, and performing an action based on the extracted at least one intent.

In an embodiment, a computer program product may comprise a non-transitory computer readable storage having program instructions embodied therewith, the program instructions executable by a computer, to cause the computer to perform a method comprising receiving, at the computer system, data relating to a plurality of aspects of at least one person, including data from at least one of physical or physiological sensors and communicatively connected devices, extracting, at the computer system, from the received data, features relevant to events relating to at least one person, extracting, at the computer system, at least one intent of at least one event relating to at least one person, and performing, at the computer system, an action based on the extracted at least one intent.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
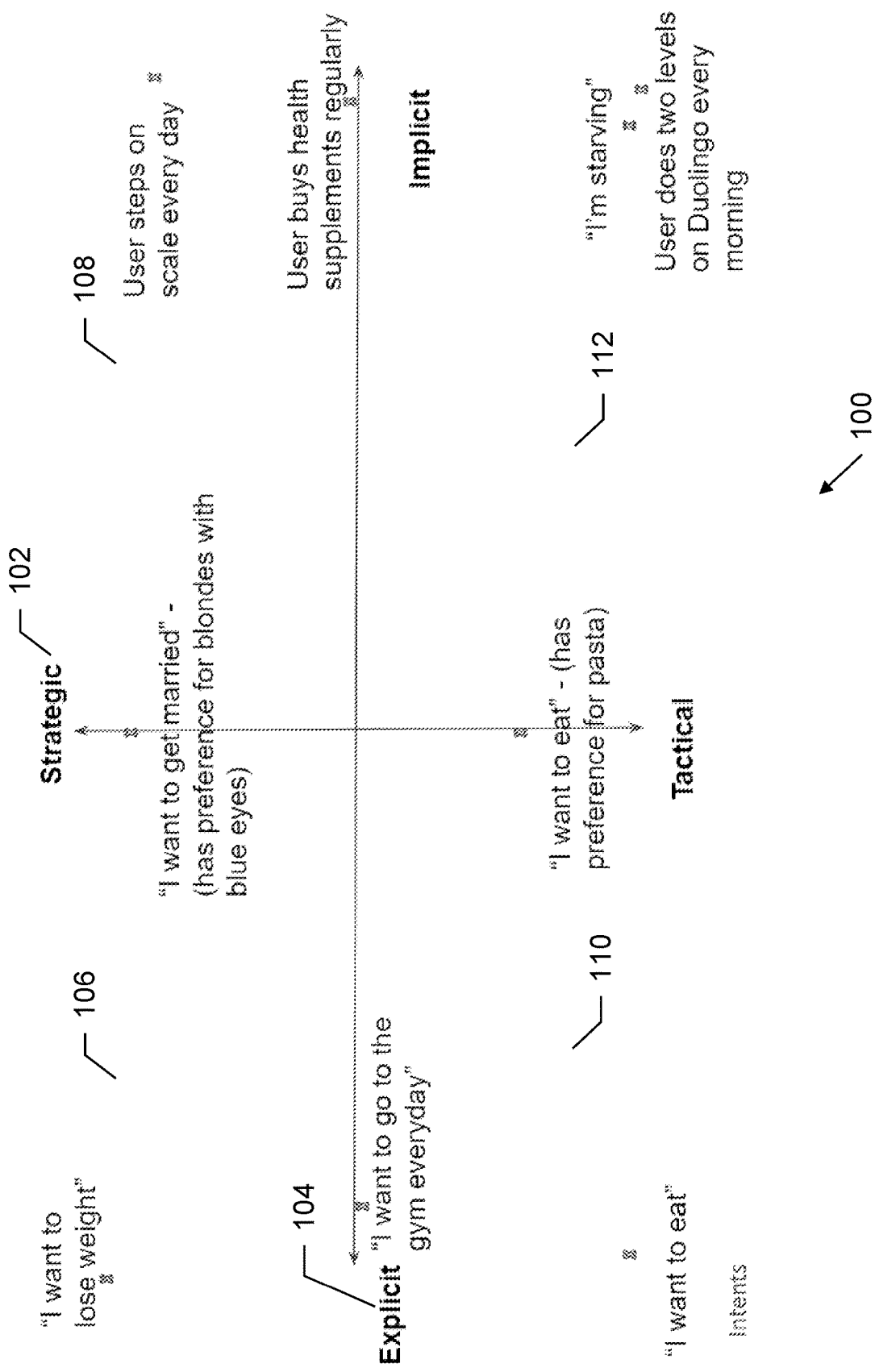
FIG. 1 is an exemplary graphic representation of two possible classification criteria.

Embodiments of the present systems and methods may provide an intelligent systems framework that may facilitate the analysis of user-generated content from various capture points to determine user intent. The system may be supported by an ensemble of ontologies that define concepts and relationships for user intentions, and represents the state of the world as is. Given the centrality of intent in human behavior and lifestyle, the resulting framework may focus at its core on facilitating the determination of user intentions based on active reasoning and in-transit data analysis.

Embodiments of the present systems and methods may utilize techniques described in U.S. Pat. Nos. 8,407,281, 8,380,902, 8,789,053, and 9,384,043, the contents of all of which are incorporated herein in their entirety.

In embodiments, an intelligent reasoning framework for user intent extraction may be provided in the context of the home. However, embodiments may be applied to other environments as well, due to the versatility of the intent extraction framework.

In embodiments, an intelligent reasoning framework may support functionalities, examples of which are described below. These functionalities may be the building blocks from which specific applications may be constructed using different subsets of functionalities in a pipeline/system.

In embodiments, Strategic and Tactical Intent Extraction may be derived from explicit user formulation and/or behavior, and from implicit user Interaction, using all available data channels in different combinations.

In embodiments, Strategic Intent Pursuit Assistance may apply to any type of strategic intent. For example, a recipe to cook or a restaurant may be suggested based on current diet intent, and medical constraints. Media may be suggested according to pursued intent, such as recommending video programs/podcasts in the area the user wants to grow. Suggestions pursuing intent with other similarly minded people may be provided, etc.

In embodiments, Daily Tasks Assistant may provide functionalities such as turning lights on/off, open/close (garage) doors, track objects, and remind user where he/she placed them, etc., based on user location and intent. Further, a Daily Tasks Assistant may suggest productivity tweaks in a user's activity, such as suggesting better timing of activities based on how activities may be parallelized or considering their dependencies to other factors, such as other people's schedules, working hours of institutions or services, deadlines, etc.. Likewise, the Daily Tasks Assistant may suggest better ways to perform tasks that may be obtained from the Web, and may show a video that presents the "better" way. A Daily Tasks Assistant may provide an automatic daily summary of one's activities, such as for health review, for the goal of obtaining feedback, etc. This may be linked to the narrativization functionality below. A Daily Tasks Assistant may provide activity coordination and suggestion. For example, if a user has in their calendar a meeting and its location, and when the user leaves home, the Daily Tasks Assistant notices that he has 40 minutes until the meeting and that the user didn't eat at all today, the Daily Tasks Assistant may recommend a restaurant and a route so that the use can obtain something to eat before the meeting. Further, the food may be tailored after the user's intent habits.

In embodiments, Supervision of Children may include audio processing to determine whether children are loud because they are having fun or because they are scared. Likewise, video processing may be used to determine whether children play with objects that can be harmful. On the playground, potentially aggressive behavior may be detected. A textual summary of the activities may be provided in which a short textual summary of a child's activities throughout the day may be provided. For example—walk to school 10 mins, football 1 hr, talking with friends, lunch, walk home 20 mins, etc. This may also be linked to narrativization as described below.

In embodiments, pets may be monitored. For example, a user may be warned when a dog chews on sofa.

In embodiments, Personal Care may be provided, for example, for disabled, elderly, ill persons, etc. For example, it may be detected when an elderly person falls down and a relative or others may be informed. It may be detected when person a faints and a relative or 911 may be informed, based on, for example, biometric properties of the person. A person's routine gestures may be learned and a robot may be trained to take over these tasks. For example, gestures such as where the remote is placed, how the coffee is brewed, unloading the dishwasher, etc., may be learned.

In embodiments, a Baby may be monitored, for example, to inform a user when the baby cries.

In embodiments, Home Defense may be monitored and provided. For example, a door may be locked if a user forgets to do so. A user may be warned of open windows when he/she wants to leave home or when it starts raining. A user may be warned of potentially hazardous situations in human interactions in the house, such as a delivery person who is in fact a burglar.

In embodiments, Proactive Warnings or Information may be provided. For example, if a user wants to leave home driving, the user may be informed about the best route to destination, or what routes to avoid. If a user goes for a run, the user may be informed if rain is forecasted.

In embodiments, Social/Family values may be displayed. For example, a representation of the most important values in the household/personality/business may be displayed based on a model that learns the culture from the ingested data.

In embodiments, Narrativization may be provided. For example, a camera may capture what goes on in the room, and embodiments may provide a description in narrative form or another representation, for example, a graph representation, which may be further analyzed by humans or natural language processing algorithms.

Classification of User Intent. Embodiments may address a number of types of intent, based on duration and form of expression. A graphic representation of two possible classification criteria is shown in FIG. 1. This may be applied to any of the data channels. As shown in this example, two classification criteria that may be used include duration 102 and form of expression 104. For example, duration 102 may include Strategic Intent: that which the user wants to achieve over the long-term in a specific domain (health, social, career, education, etc.) and Tactical Intent: that which the user wants to achieve over the short-term; short term activities. Likewise, form of expression 104 may include Explicit: the intent is explicitly presented to the system and can be directly detected, and Implicit: the intent needs to be derived from one or a combination of data sources that do not express it directly.

The way of detecting and responding to intents may depends on which quadrant they lie in. For example, Explicit Strategic intent 106 may involve a user explicitly expressing a long-term goal, such as "I want to lose weight". In this case, embodiments may confirm and store the strategic intent. Embodiments may give advice on how to achieve the goal, but there are no other immediate steps to take.

Implicit Strategic intent 106 may involve long term goals which embodiments may infer from a user's behavior. For example, if embodiments see that the user steps on a scale daily, a weight related goal may be inferred. Maybe the user wants to lose weight, or wants to bulk up, or just wants to keep a steady weight. Which one of these three scenarios is true must be determined from other signals. Embodiments may not act on these immediately, but may wait for further confirmation from other data channels. When the confidence is high enough, embodiments may prompt the user and ask them about the assumed goal.

Some forms of expression may contain a mix of explicit and implicit structure. For example, the user may say that they would like to get married (the explicit part). The implicit part would come from a dating history which reveals a preference for blondes with blue eyes.

Explicit Tactical intent 110 may usually be immediately answerable by giving recommendations, directions, placing orders and so on. The classic example is "I want to eat", in which case embodiments may suggest nearby restaurants.

It is possible for an intent to be a combination of strategic and tactical. For example, if the user says "I want to go to the gym daily", that is a longer-term intent, not just something they will do now, but at the same time, it is not a goal by itself. Most people don't go to the gym for fun, but because they want to be fit or they want to look different.

Implicit Tactical intent 112 is the case for behaviors where the formulation is not explicit, but embodiments may still give immediate suggestions. If the user says "I'm starving", it means they want to eat. If embodiments notice that the user practices daily on a language flash card app, embodiments may start suggesting related content (this corresponds to tactical, because using the app has a direct influence on learning a language, while stepping on a scale is strategic because it has no direct influence on losing weight).

Figure 2:
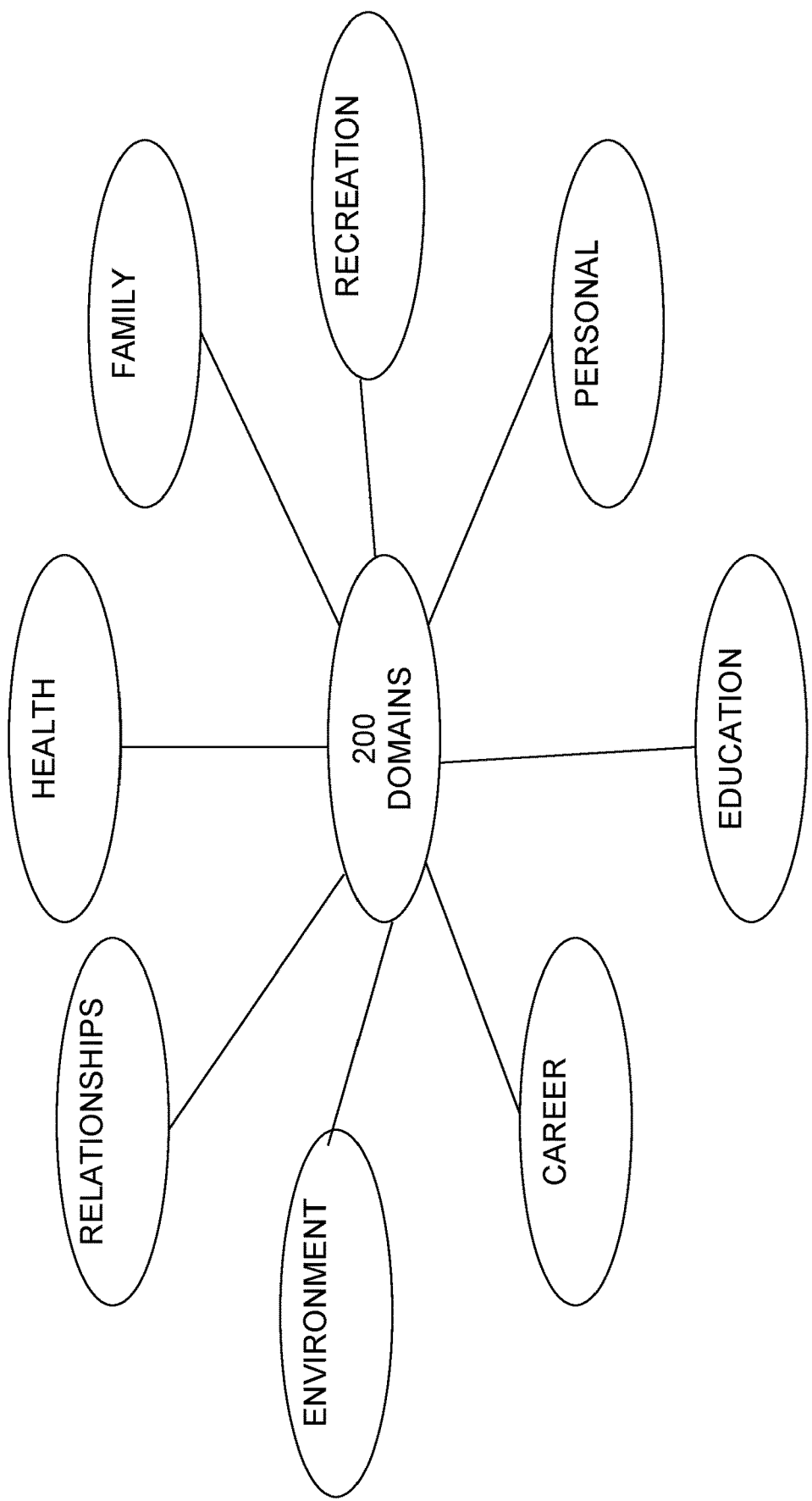
FIG. 2 is an exemplary diagram of examples of intent domains that embodiments may support.

Intent Taxonomy. FIG. 2 shows examples of intent domains 200 that embodiments may support.

Figure 3:
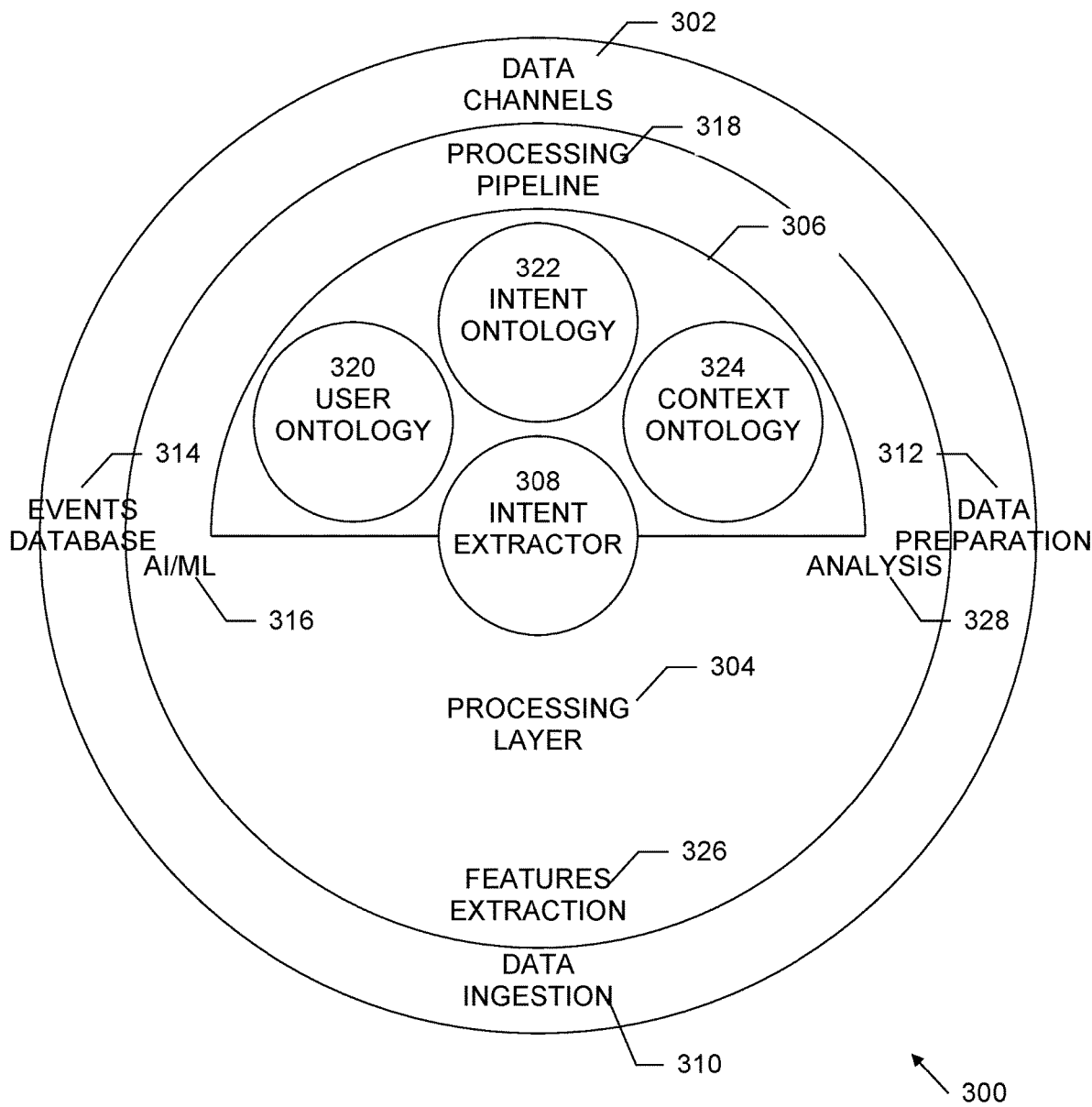
FIG. 3 is an exemplary block diagram of an intent extraction reasoning framework according to embodiments of the present systems and methods.

The Reasoning Framework for Intent Extraction. High Level Architecture. An example of an intent extraction reasoning framework 300 is shown in FIG. 3. Framework 300 may include Data Channels Layer 302, Processing Modules Layer 304, Ontology Ensemble Layer 306, and Intent Extractor Layer 308. Data Channels Layer 302 may include an input layer for each data channel 310, data preparation 312, and data storage 314. Processing Modules Layer 304 may include Data processing using Artificial Intelligence (AI)/Machine Learning (ML) algorithms 316 in processing pipelines 318, Ontology Layer Updates, and Models Training Loop. Ontology Ensemble Layer 306 may include an ensemble of types of ontology for creating a comprehensive model-driven knowledge base. Intent Extractor Layer 308 may combine processing output, ontology knowledge, and any other available external resources for intent extraction.

Architecture Description. Ontology Ensemble Layer 306 may include ontologies such as User Ontology 320, Intent Ontology 322, and Context Ontology 324. User Ontology 320 may include data relating to User Profiles, User Attributes, User Disciplines, User Interests, etc. Intent Ontology 322 may include data relating to intention levels or magnitudes, intention properties, relation between intentions, intention types, etc. Context Ontology 324 may include data relating to Context Properties, Purposes, Types, Dependencies, Sub-contexts, Relations between contexts, etc.

Ontologies deal with data and categories in a subject area or domain that shows their properties and the relations between them. Embodiments may use ontologies methodology to create a supporting framework for intention query by defining: Concepts, Sub-concepts, Relationships, and Expressions/Intentions (aggregation of multiple concepts).

Embodiments may have an ontology ensemble formed of at least three types of ontologies: User Ontology 320, Intent Ontology 322, and Context Ontology 324 and to create a system of dependencies among these ontologies.

A query on the ontology ensemble may determine an intention with an associated accuracy (probability). For example, by giving a user profile with associated attributes, interests, and disciplines (from User Ontology 320) and a context with corresponding dependencies (from Context Ontology 324), a set of initial possible intentions (from Intent Ontology 322) may be identified, which may be combined with the data channel points analysis (processing module 304) for determining the final intention.

A static context representation may insert bias in the prediction system. One way of approaching this problem is to use dynamic ontology instances that may be updated online. Also, the concept of a context inserts at least two important dependencies. There may be a location-dependent context (some actions/intents are improbable at some locations, but are highly probable in some other places), or user-dependent context (depending on the user health, deadlines, social context and other elements, a new layer of actions/intents probabilities may be added). Therefore, the context may, at minimum be the result of interaction between location-dependent contexts and user-dependent contexts.

Data Channels Layer 302 may provide the input for each data type, retrieving live data from various capture points that a user is exposed to, given that a user may have direct interaction with multiple IoT devices, such as smart mobiles, smart refrigerators, smart watches, smart fire alarms, smart door locks, smart bicycles, medical sensors, fitness trackers, smart security systems, voice controllers, dash buttons, doorbell cams, mobile robots, smart light switches, air quality monitors, etc., physical and physiological sensors, such as audio sensors, video sensors, electro-encephalogram (EEG) sensors, electro-cardiogram (ECG) sensors, heart rate sensors, breathing rate sensors, blood pressure sensors, body temperature sensors, head movement sensors, body posture sensors, and blood oxygenation levels sensors, or other capture points. Data Channels Layer 302 may provide specific APIs and interfaces for all hardware and software external data systems that need to be connected to the framework for data ingestion. This may include any system which can be deemed as a relevant data source for intent extraction, including hardware (surveillance camera, mobile phone, gadgets, etc.) or software (other existing applications that the user is connected to, or that can provide useful universal valuable data, etc.). Once the data is ingested, embodiments may preprocess the data 312 and transform it according to a universal schema. The data may then be stored in the Event Database 314 under a unique timestamp.

Processing Modules Layer 304 may include components such as an ontology component that attaches to Ontology Ensemble Layer 306, enabling real-time communication between Ontology Ensemble Layer 306 and Processing Modules Layer 304, with the purpose of periodic ontological concepts updates. Processing Modules Layer 304 may include a processing component that may perform features extraction 326 and data analysis 328 to infer primary features from all data channels, which may be used for intent extraction at a later stage. This may be achieved by using artificial intelligence, machine learning, and various algorithms and techniques, using as an input the data stored from all data channels the user was exposed to. This component may provide a multistage processing and reasoning pipeline 318 for a diverse range of feature extraction with specific future goals in mind. Processing Modules Layer 304 may include a models training loop component is responsible for re-training and updating at the processing models level, using different score functions, the input, and the output of the models.

Some actions are highly-specific predictors for particular intents while others are human behavior-specific (not related to user intent). To make good use of initial scarce data, embodiments may tag highly-specific actions (like searching for car keys) as explicit intents (so that the user is not asked questions like "do you want to drive your car?"). Embodiments may mitigate the signal to noise ratio issue by tagging some human behavior-specific actions as low-signal and by using instruments like pointwise mutual information.

Intent Extractor Layer 308 may be responsible for combining the outputs from Processing Modules Layer 304, Ontology Ensemble Layer 306, and any other resources to provide a final stage reasoning capability for the intention extraction framework 300. Intent Extractor Layer 308 uses ensemble models to process and integrate persona DB 454, Ontology 444, and extracted features for intent prediction. Intent Extractor Layer 308 may experiment with different ensemble models to find an optimal stack of predictors.

Data Channels. High Level Description. Intention extraction framework 300 may have access to a plurality of data channels, including: Audio: microphone, Video: room camera, fridge camera, Sensor Data: temperature, humidity, biometrics, Browsing Data: browsing history, bookmarks, browsing behavior (time spent on particular web pages, etc.), Location history: from the user's smartphone or another wearable device, User's calendar with past and upcoming events, Social media activity, posts, social network graph, text, audio, video or social media content (such as twitter data, Facebook data, LinkedIn data, etc.), Text Data: Chat, SMS, Email etc., Health-related data: medical visits, current diseases, various treatments, Reflected Radio Signal data: we can use transmitters and highly sensitive radio receivers and sensors to monitor indoor real-time movements, breathing, cardiac frequency and sleep patterns, etc.

When embodiments do not have access to particular types of data, the user may explicitly provide such data. For example, the user may formulate the medical restrictions or requirements he/she may have.

Various types of data may be used for different purposes. For example, a Video Data Channel may use the footage from cameras to analyze what the user is doing (low level tactical intent). The users' actions may be mapped to intents and actions may be highlighted that support or are counter to their stated goals. The success rate of existing strategic intents may be checked.

A Location Data Channel may provide location history, which may reveal a lot about a user's preferences and goals. In embodiments, such location data may be obtained from a tracking app or may be obtained or extracted from other providers. Embodiments may extract mid-level tactical intents, such as based on a weekly visit to a hospital, a monthly visit to the opera, frequent visits to a flower shop and then to a particular house, etc.

Conventional recommendation engines today optimize for watch time and clicks. A Browsing History Data Channel may provide the data needed to provide recommendations based on intents (not just interests). This may also provide the capability to support and reinforce behaviors. Algorithmic curation may be used to benefit the user, not just maximize advertisement revenue. Browsing History Data may provide the capability to learn preferences of the user in an implicit way, help the user get out of information bubble, and receive advice/information related to existing strategic intents.

People share a lot of information about themselves on social media, thus a Social Media Data Channel may provide considerable useful data. For example, embodiments may learn intents from posts by inferring sentiment, may learn intents and preferences from social graphs assuming people interact more with similar people, may provide analysis of Twitter, Facebook, LinkedIn, etc., to explore metrics such as social influence, graph centrality, eigenvector centrality, etc., and may; earn personality from posts, which may be more effective and efficient than, for example, asking users questions to get personality profile, as Facebook, for example, may know personality traits better than a user does.

An exemplary block diagram of components of a reasoning framework for intent extraction 400 is shown in FIGS. 4A-D.

Figure 4A:
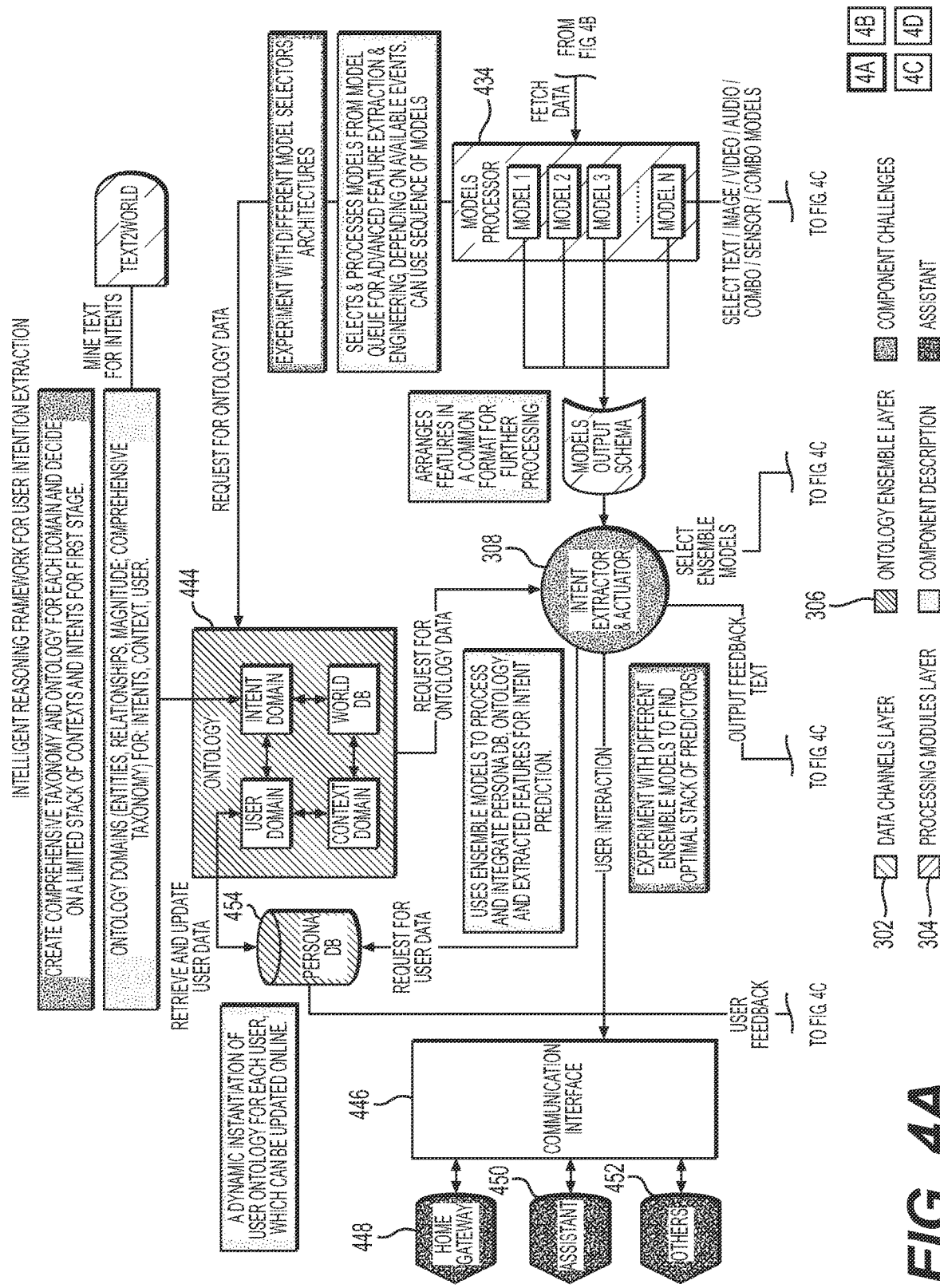
FIGS. 4A-D is an exemplary block diagram of components of a reasoning framework for intent extraction according to embodiments of the present systems and methods.
Figure 4B:
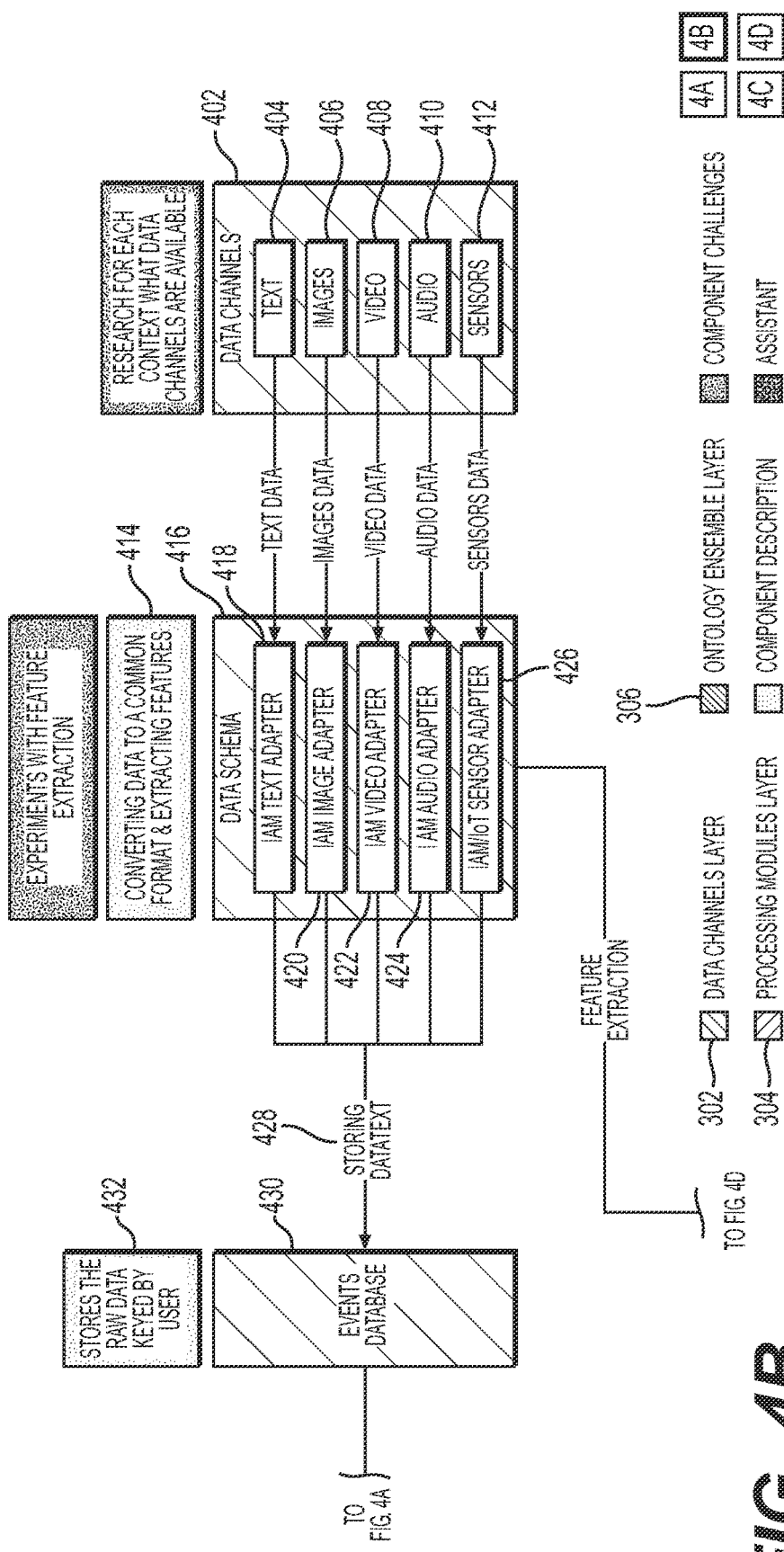

As shown in FIG. 4B, user data points may be acquired by Data Channels Layer 302, shown in FIGS. 4A-D. Data points may come in through data channels 402, which may represent various data sources, such as IoT sensors, the IAM Assistant App, all available connected devices, and any external data system that is integrated with our reasoning framework system. The data may include various data types, such as text data 404, image data 406, video data 408, audio data 410, sensor data 412, etc. The data from different sources may be converted 414 to a uniform representation using a data schema 416, which may include adapters for various data types, such as IAM text adapter 418, IAM image adapter 420, IAM video adapter 422, IAM audio adapter 424, IAM sensor adapter 426, etc. The converted data 428 may then be stored in events database 430, along with a recording timestamp and user information 432, that may be input by a user. Data channels shall be implemented, for example, as Kafka Publishers, with the converters (adapters 418-426) from data schema 416 acting as Kafka Consumers.

Figure 4C:
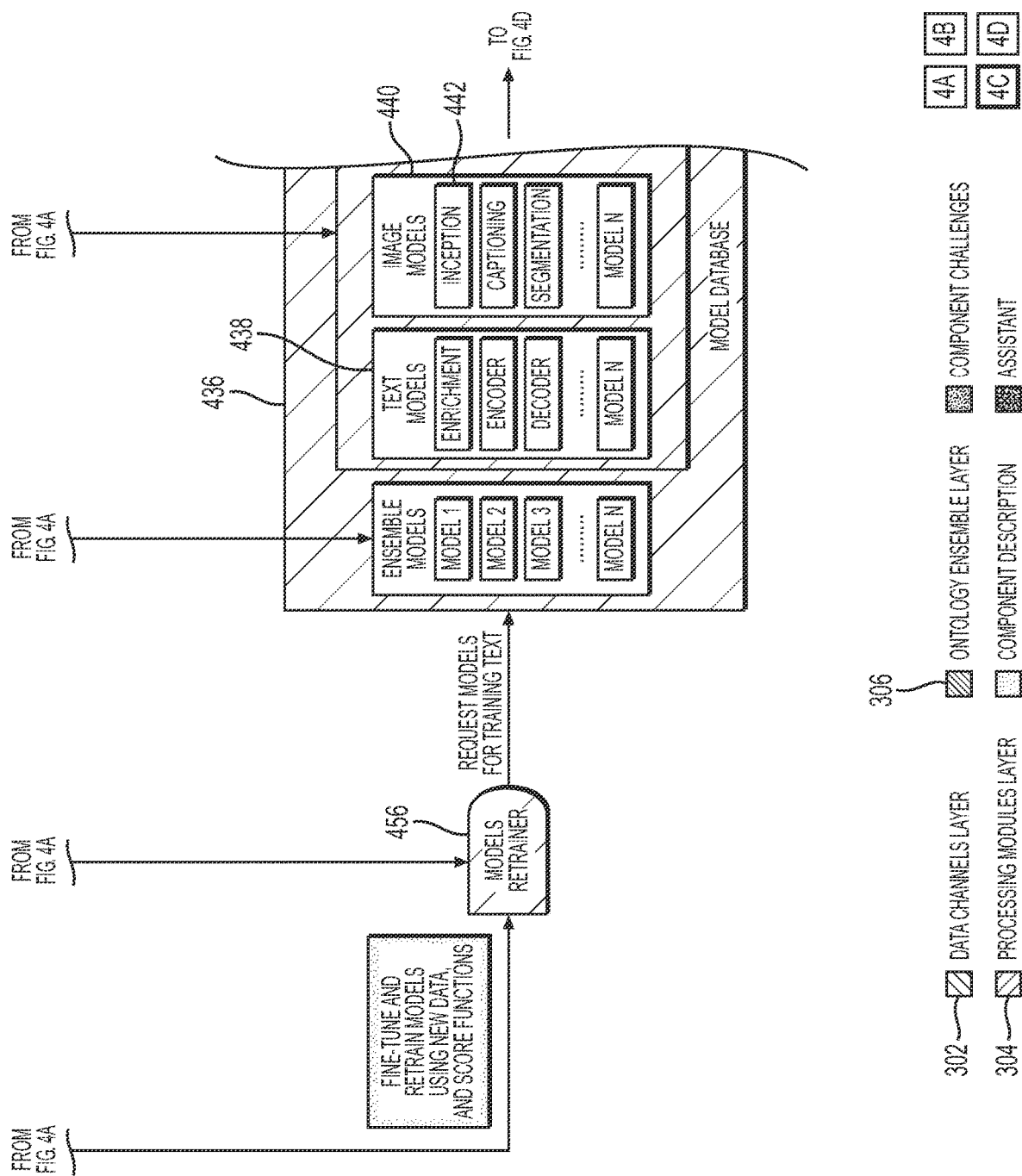
Figure 4D:
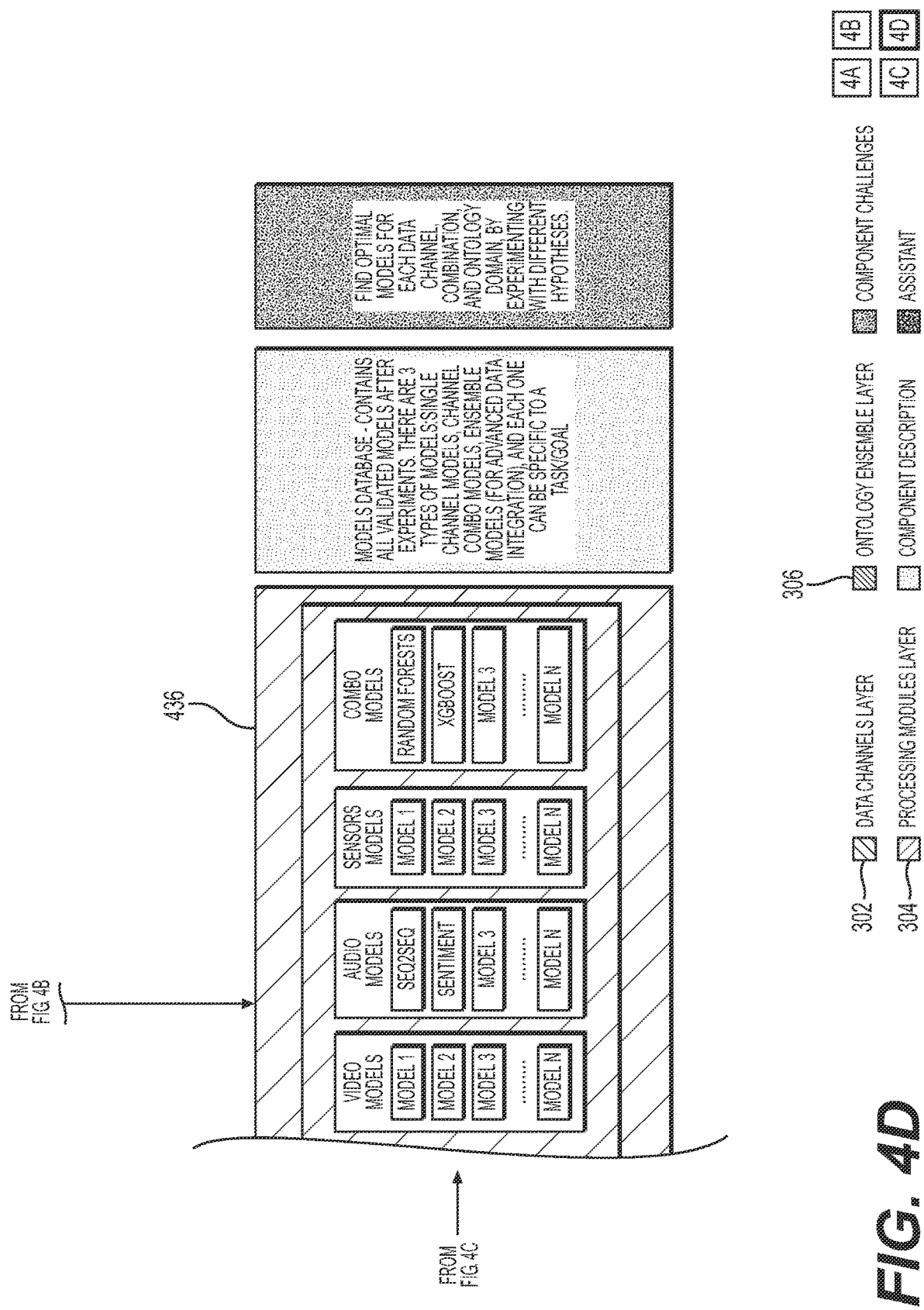

Events may be processed as they happen by the Processing Modules Layer 304, which may include Models Processor 434, shown in FIG. 4A, and Models Database 436, shown in FIGS. 4C, 4D and which, depending on the available data channels, may generate a processing pipeline and then search for the selected models in the Models Database 436. For example, on textual data, one or more text models 438, which may include a sentiment analysis module or a sentence embedding module may be run, while for image models, objects may be recognized using Inception module 442.

Models Processor 434 may be a container running, for example, TensorFlow Serving (or a similar software framework). The models may be saved on Models Database 436, which may have a distributed file system, and the models may be saved along with their metadata (such as version, inputs, and outputs). The models may have a simple cross language interface (such as Protocol Buffers), which may provide the flexibility of integrating models from different software languages and frameworks (such as TensorFlow, Scikit-learn, Custom Python, Java code, etc.).

The output from Processing Modules Layer 304 may be sent to the Intent Extractor 308, which may combine such output with Ontology data 444 and any other external sources to determine most a likely intent that would generate these data points. If necessary, a response may be sent through communication interface 446, to home gateway 448, assistant 450, or any other interface 452 that may be connected to framework 400. Also, Persona database (DB) 454, for the current user, may be updated with the latest inferred intents. In embodiments, Intent Extractor 308 may be a separate service, running an expert system that may generate these decisions.

The Persona DB 454 may include all the information the system has about the user, mapped onto the user ontology, with links to the inferred intents, from the intent ontology. In embodiments, Persona DB 454 may be implemented as a document-oriented database with the schema derived from a user's ontology.

The intent domain may also be automatically updated periodically using, for example, the Text2World algorithm, which mines large amounts of text data to learn how different actions are clustered together and how they relate to specific intents. This component may update the intent ontology by running, for example, as a batch job written in Java on an Apache Spark cluster.

Some or all models from model database 436 may be periodically retrained in the models re-trainer 456, shown in FIG. 4C, with new available data, to make sure that their prediction capacity remains up to date. Models re-trainer 456 may recreate each model, for example, by running as a batch job in a distributed cluster.

6 Starting Hypotheses

These experiments are meant to be building blocks for the larger system. Each experiment yields a component/module that achieves the desired outcome within some performance margin (an indicator of performance is accuracy). During the allocated time, a common pattern will be followed: (1) Build a baseline; (2) Iteratively enhance its performance in allocated time frame. Most modules can act both as standalone components or be part of a larger pipeline.

Embodiments may determine what objects a user interacts with by detecting, for example, common household items from an image. Functionality may include object detection from an image, which may include selecting training data sources (e.g. ImageNet, COCO), selecting image recognition approaches (ex: RCNN, YOLO, SSD), training machine learning (ML) models using ML specific tools, such as transfer learning, hyperparameter search, architecture tuning, etc.

Embodiments may determine what a person does by detecting action from a short image sequence. Functionality may include end to end action detection from video sequences.

Embodiments may determine the persons in a surveyed area and identify each person. Functionality may include object detection and tracking (focus on persons), face recognition, person recognition from video (pose, clothes), person recognition from IoT, security, and other devices, sensor fusion (video, IoT, etc.), etc.

Embodiments may describe the actions in a video sequence to summarize the actions for a time period, such as a day. Functionality may include detecting action from a short image sequence focused only on one actor and to distinguish one action from another. Functionality may include tracking a person through a video sequence, image segmentation, an attention mechanism (in the context of Deep Learning (DL)), application of e2e action detection to parts of an image sequence, etc.

Embodiments may provide alerts when out of the ordinary situations occur. Given a list of daily tasks, can one predict or detect the outliers? Functionality may include automatic altering as manually programming each possible scenario is hard and surely does not cover all the personal preferences. Functionality may include automatically inferring regular patterns of activity and detecting outliers, for example, using process mining, outlier detection from classical machine learning, etc. Based on the model, possible outcomes may be generated.

Embodiments may integrate several data modalities and produce decisions based on them. Ingress may include the output of other data processing subsystems (for example, intent detection, activity detection, geotracking, etc.). Embodiments may provide flexibility and configurability. The actual integration mode of embodiments may vary based on available data and new data streams that are available. Functionality may include expert systems, dense embeddings, Machine Learning algorithms, such as classical and DL based, etc.

Embodiments may provide monitoring of elderly, disabled, and ailing persons in order to detect, for example, a person falling, feeling ill, being in distress, etc. Embodiments may make recommendations to the caregiving personnel regarding a monitored person based on learning the person's routine gestures and objects, so the person's transition from home to care facility is smooth. Functionality may include intent detection, action detection, ML on IoT time series data, including, for example, health monitors, identification of the person, expert systems integrating data from various inputs with health records, detect objects and actions in video feeds, compile a list of most common household objects and habits, answer specific questions about objects/habits, etc. For example, embodiments may distinguish between a grandparent playing hide and seek versus having a stroke.

Embodiments may provide an integrated neighborhood administrator system that may determine what the common habits, behaviors, and activities of the inhabitants are and answer questions about such habits, behaviors, and activities. Embodiments may identify frequent actions and their context. Functionality may include processing multimodal data streams, extracting intent, extracting context (ontologies), extracting actions, extracting objects (video), learning the "culture" of the community by analyzing the processed data, etc. Embodiments may provide answers to questions, such as: Is this administrative policy appropriate for the neighborhood? For example, should an electric car charger be installed in a certain area, when people already park their cars there. For example, providing housing recommendations, "Will my family fit?" or "Where is the best community for me, given my habits?"

Embodiments may provide a security assistant to, for example, identify people wielding hazardous objects and trigger an "alarm". Embodiments may detect certain objects from videos with true positive rate approaching 100%. Objects detected may include, for example, matches, knives, guns, etc.

Embodiments may predict and detect shooting-situations and warn the appropriate responders. Shooting-situation prediction and detection is a very delicate subject: harmful consequences can happen if the detection system is not sensitive and specific enough. Embodiments may provide a multi-component system for shooting situation prediction and detection, making use of the intent detection framework for shooting-intent prediction and using a multi-channel detection system as a fail-safe (shooting-intent-prediction may fail for multiple reasons: gun concealing, missing information, etc.). Shooting-situation detection may use a plurality of data channels (such as audio, video, radio, etc.) for crowd panic detection and shooting-pose recognition.

Embodiments may provide a work-assistant to develop and deploy new apps tailored to the user's needs and objectives. Functionality may include code generation and data processing.

Embodiments may provide health assistant to aid the user by preventing and early-detecting the health issues. Embodiments may utilize health-related data access, genomic data. clinical data, health history data, etc. and may provide health-risk prediction and (early)-diagnosis prediction.

Embodiments may provide a delayed-aging assistant to recommend and facilitate the most up to date practices.

Embodiments may provide a learning assistant to develop user-tailored curricula based on best learning methods and quality, fact-checked content. Functionality may include text comprehension, intent prediction (but we can make it explicit-we don't actually need to predict the learning objective), reviewing learning and research, tracking learning progress, using methods to enhance retention, etc.

Embodiments may provide an automated child supervision system to determine in each moment where the supervised children are and what are their activities. Functionality may include person identification and tracking, action detection, an activity summary for a given period of time with real time push reporting, etc.

Embodiments may provide an Intent extractor and actuator to infer what the appropriate action for a given situation is, given the overall goal of the use case, for example, to keep a particular person safe. Embodiments may use methods that will integrate all the available information and be able to generate an action (even if the action is "do nothing"). Functionality may include expert systems, a policy generators for agents, reinforcement learning, etc. Embodiments may create controlled scenarios with the expected output including "Ideal" scenarios and noisy scenarios and may determine the best channel to express the action, such as text to voice (personal device, automated phone call), IoT device actuators (for example, closing an automated door, ringing an alarm), etc.

Technologies that may be used to implement components of embodiments of the present systems and methods may include Semantic Networks/Knowledge Graphs such as BabelNet, ConceptNet, Google Knowledge Graph, WordNet, etc., which may be used for hierarchical intent dataset creation (standalone and combined with other sources). A subset of this database may represent a portion of a hierarchical intent database.

Augur Model Summary—Domain Specific Language for extracting relationships between objects and human activities, and structuring the results as a Vector Space Model including sequential human activities, objects fit for activities, activities that can be performed on objects, etc. Hierarchical Tactical Intent to Strategic Intent-create an oriented graph from the pairs of activities that follow each other, use graph clustering algorithms to detect activity clusters, map clusters to strategic intents, etc. Computer vision may be used to extract actions from objects in images/videos and to perform intent extraction from images/videos.

Event2Mind may be used to restrain activities to real-world images and use those captions for predicting Intents, and to create a new human-actions dataset from the intersection between the Event2Mind dataset and real-world images captions.

Model Combinations may use a model for, for example, The Stanford Natural Language Inference (SNLI) Corpus on pictures (of humans) captions (make use of Augur & Event2Mnd). Different models may be combined for better results. Natural language processing inference models may be tailored to tactical/strategic intent determination. Bayesian Models may be used for Probabilistic Intent Determination.

High Accuracy Rule-based Question Classification using Question Syntax and Semantics may be performed. Pure rule-based modelling for question classification using syntax and semantics may be performed. The model may be adapted for intent determination. Deep learning enhancement for increased accuracy of intent prediction may be performed.

Better text understanding through image-to-text transfer may provide better text representation (for example, solving some word2vec pitfalls by using pre-trained CV models—GoogleNet, Inception-v3, VGG, ResNet, etc.) Augur & Event2Mind models may be enhanced.

Computer Vision may be used for transfer learning (for example, using Inception, googlenet, etc.), object detection may be performed using, for example, augur, image captioning may be performed using, for example, Event2Mind. Behavior and next actions may be predicted from images. Very High-Accuracy Face Recognition may be performed. A face does not have to be recognized from the first video-frame. Rather, high-accuracy face recognition may be achieved by combining multiple video frames prediction (various angles, positions, etc.) into a probabilistic system. This method may also be used to differentiate between a real-face and a photo-of-a-face.

For example, JHipster may be used to implement for the fulfillment backend. The frontend may be implemented using, for example, Websockets, Yarn, Angular 5, etc., while the backend may be implemented using, for example, Spring Boot, Maven, Spring MVC REST+Jackson, Spring Data JPA, etc. PostgreSQL, for example, may be used for storing data, Elasticsearch, for example, may be used for searching data, and Google DialogFlow, for example, may be used for processing user queries.

Batch jobs may be implemented using, for example, Apache Beam for processing machine learning training data, Google BigQuery for large analytical queries of the machine learning data or an analytical data warehouse, such as Apache Hive, TensorFlow for machine learning models, Spacy for natural language processing, etc.

Additional infrastructure may be implemented using, for example, Docker, Jenkins CI, Google Cloud Storage for hosting training data, a distributed file system, such as HDFS, Google Dataflow for running parallel training models, Apache Beam (Apache Spark, Flink, etc.).

Object Detection from an Image.

Action recognition from an image or sequence of images to recognize the action performed in an image or a sequence of images. The recognized action may be a tactical intent to which embodiments may respond, or may be an action that can be used in conjunction with the ontology ensemble to infer strategic intent.

For example, Tran et al. 2015 have used 3-dimensional convolutional networks for action recognition on Sport1M (Joe Yue-Hei Ng et al. 2015) and UCF101 (Wang and Gupta 2015) datasets with accuracies of 90.8% and 85.2%, respectively. Wang and Gupta 2015; Wang et al. 2016 have introduced a framework for video-based action recognition employing temporal segment networks. They have obtained good accuracies for action recognition on the HMDB51 (Kuehne et al. 2011) (69.4%) and UCF101 (94.2%) datasets.

Action prediction in a sequence of images may be performed to predict what are the most probable actions performed by an actor in a sequence of images. The predicted action may be a tactical intent to which embodiments may respond, or may be an action that can be used in conjunction with the ontology ensemble to infer strategic intent. Koppula and Saxena 2013 have obtained an activity prediction accuracy of 75.4%, 69.2% and 58.1% for an anticipation time of 1, 3 and 10 seconds respectively.

Narrativization may be performed to extract a phrasal or an intermediate numerical representation (embeddings, feature vectors) from an image of an ordered sequence of images. To be able to obtain a collection of words describing the objects/activities in an image, embodiments may pass through an intermediate numerical representation in a dense vector space (so called "image features" in the context of deep learning). This intermediate numerical representation may be processed into a more domain specific pipeline that can determine the relations between agents, activities, and objects. Embodiments may use an implementation similar to the work of Fast et al. 2016.

Figure 5:
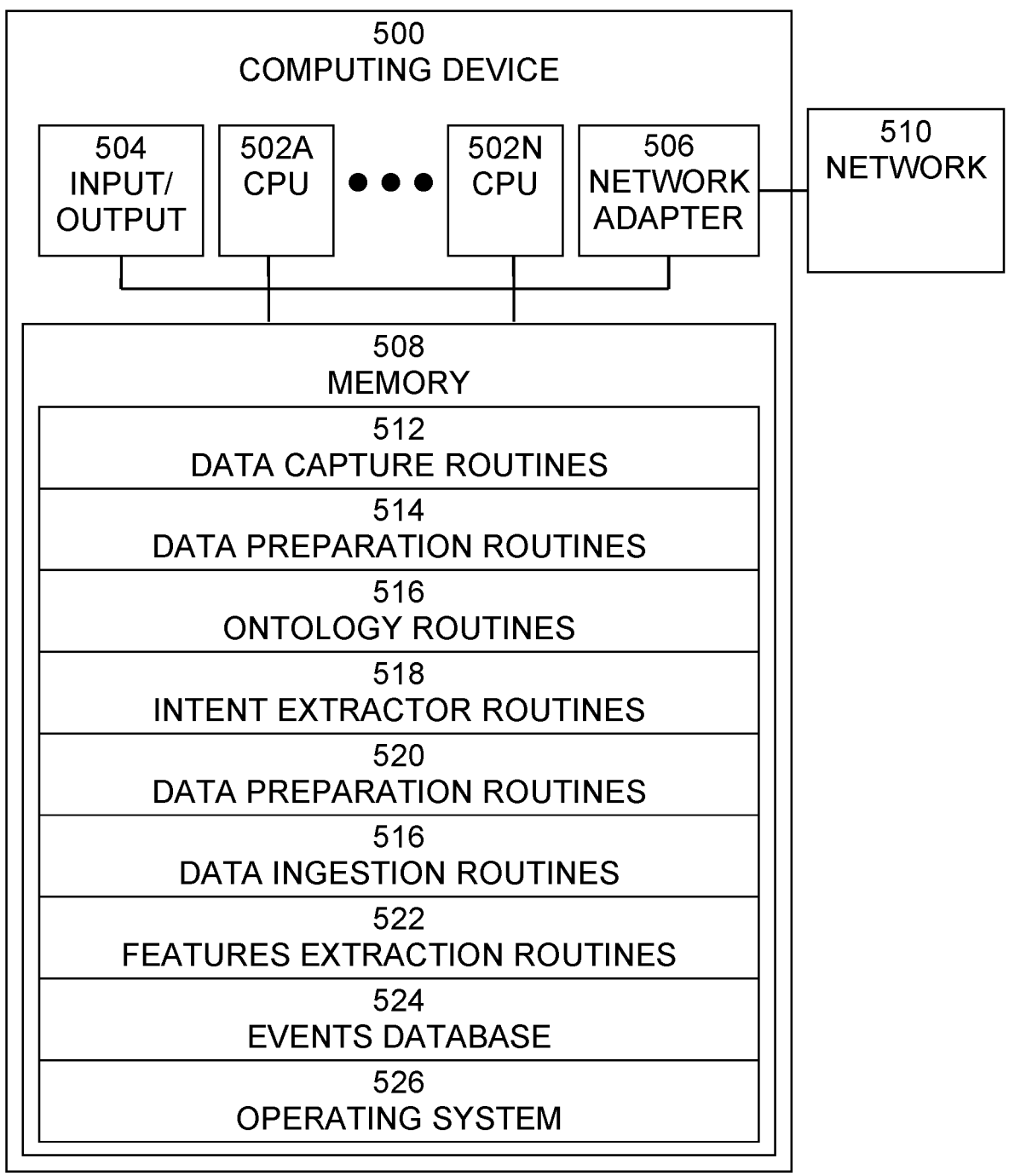
FIG. 5 is an exemplary block diagram of a computer system, in which processes involved in the embodiments described herein may be implemented.

An exemplary block diagram of a computer system 500, in which processes involved in the embodiments described herein may be implemented, is shown in FIG. 5. Computer system 500 may be implemented using one or more programmed general-purpose computer systems, such as embedded processors, systems on a chip, personal computers, workstations, server systems, and minicomputers or mainframe computers, or in distributed, networked computing environments. Computer system 500 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor. FIG. 5 illustrates an embodiment in which computer system 500 is implemented as a single multi-processor computer system, in which multiple processors 502A-502N share system resources, such as memory 508, input/output circuitry 504, and network adapter 506. However, the present communications systems and methods also include embodiments in which computer system 500 is implemented as a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system 500. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system 500 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include data ingestion routines 512, data preparation routines 514, ontology routines 516, intent extractor routines 518, features extraction routines 520, events database 522, and operating system 524. Data capture routines 512 may include software routines that provide the capability to obtain data from data channels, as described above. Data preparation routines 514 may include software routines that provide the capability to preprocess the data, transform it according to a universal schema, and store it in event database 524 under a unique timestamp, as described above. Ontology routines 516 may include software routines that provide the capability to implement an Ontology Ensemble Layer, as described above. Intent extractor routines 518 may include software routines that provide the capability to combine the outputs from various resources to provide a final stage reasoning capability, as described above. Features extraction routines 520 may include software routines that provide the capability to extract features to be analyzed from the data, as described above. Events database 522 may provide the capability to store processed and transformed data, as described above. Operating system routines 524 may provide additional system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Embodiments of the present systems and methods may utilize Sentic Computing, which may include, as a fundamental precept, that, in envisioning intelligence, concepts are inextricably bound with feelings. That is, a concept may present a cognitive stimulus, but the reaction (or response) to that stimulus can involve any number of emotional states: anger (evolved for reaction), fear as a means of self-preservation, or affection. Thus, if these emotions contribute to the human mind state and are a prerequisite for understanding intelligence in the same way as intentions, then it is important to understand how each of these cognitive phenomena interacts with the other.

Sentic computing is a multi-disciplinary approach to opinion mining and sentiment analysis that involves the use of: Artificial Intelligence (AI) and Semantic Web techniques, for knowledge representation and inference; mathematics, for carrying out tasks such as graph mining and multi-dimensionality reduction; linguistics, for discourse analysis and pragmatics; psychology, for cognitive and affective modeling; sociology, for understanding social network dynamics and social influence; finally ethics, for understanding related issues about the nature of mind and the creation of emotional machines.

By parsing existing sets of personality and sentiment data, such as SenticNet, and deriving mind state from parts of speech, determining mean sentiment value, and identifying personality types based on specific metrics such as extroversion and conscientiousness, our approach promises to provide more faithful analysis across a broader range of characteristics and actions than present cognitive analytical tools. Ultimately, Sentic-IA will not be limited to the clinical realm. We envision several application areas, such as predictive analysis, in which Sentic-IA would be used to detect personality types, current mind state and intentionality based on diction and language use, as well as measure trust.

In prior published research, we have examined the ensemble application of Sentic computing and intention awareness techniques to evaluate the feasibility of developing a novel analysis framework for estimating the effects of diplomatic, informational, military, health, and economic activities in the context of a military theater of operations.

In particular, we were able to identify the following needs: (1) understanding and representing the underlying causality within the population; (2) formulating models that are both sensitive and computable; (3) validating the predictions of population beliefs, intentions, and behaviors by model. These requirements can be similarly mapped to the evaluation of individual actions and cognition. For instance, a Sentic-IA effort to diagnose and/or detect psychiatric disorders in an individual would seek situational causality (i.e., traumatic life events), data structures amenable to computational analysis, and comparison with existing evaluation data sets to ensure the validity of our conclusions.

Another central facet of our methodology is Intention Awareness (IA), hence the name Sentic-IA. Instead of modeling the environment based on objects and apparent attributes such as speed, direction, and numbers, IA exploits circumstantial semantics and Sentics, that is, the conceptual and affective information associated with objects and actors of the operating environment, and combines them with prior events to construct an event space from which human intentions can be inferred. The result is not entirely unlike enhanced SA, but due to its incorporation of human actor characteristics, it offers greater causal dimensionality.

Sentic-IA seeks to solve several yet-unaddressed issued in sentiment and cognitive analysis, and will ultimately be used for a number of applications, ranging from the disambiguation of vocal input to the improvement of human-machine interfaces and the construction of new models for cognitive disorders and cognitive profiling. Specifically, we can use Sentic-IA personality analysis to determine optimal user interface experience, including information presentation and fetching, as is used in search engines and data mining applications. Given sufficient data-richness, Sentic-IA can also be used to detect the onset of psychiatric and psychological disorders, such as PTSD by identifying personality types as risk factors, and then comparing with mind state tendency over the last n years). Using MSI-based analysis of mind state, as well as Sentic/MSI personality analysis Sentic-IA also promises to provide a new means to determine the quality of a person's intentions and use this information to construct a more fine-grained analysis of their behavior and cognitive patterns.

Based on prior published research about Intention Awareness and its spatiotemporal relationship with cognition, we hypothesize that we can extend our ability to predict and model intentions, which currently relies on mapping events and intentions to one another chronologically, by including Sentic-based analysis of these components as well as individuals.

Sentic-IA relies on a tripartite construction of the subject's overall condition, which includes personality type, present mind state, and the content of the interaction being analyzed. Personality type is derived from behavioral and rhetorical tendencies over long periods of time, but there are numerous other components that contribute to the Sentic-IA computational analysis engine.

Figure 6:
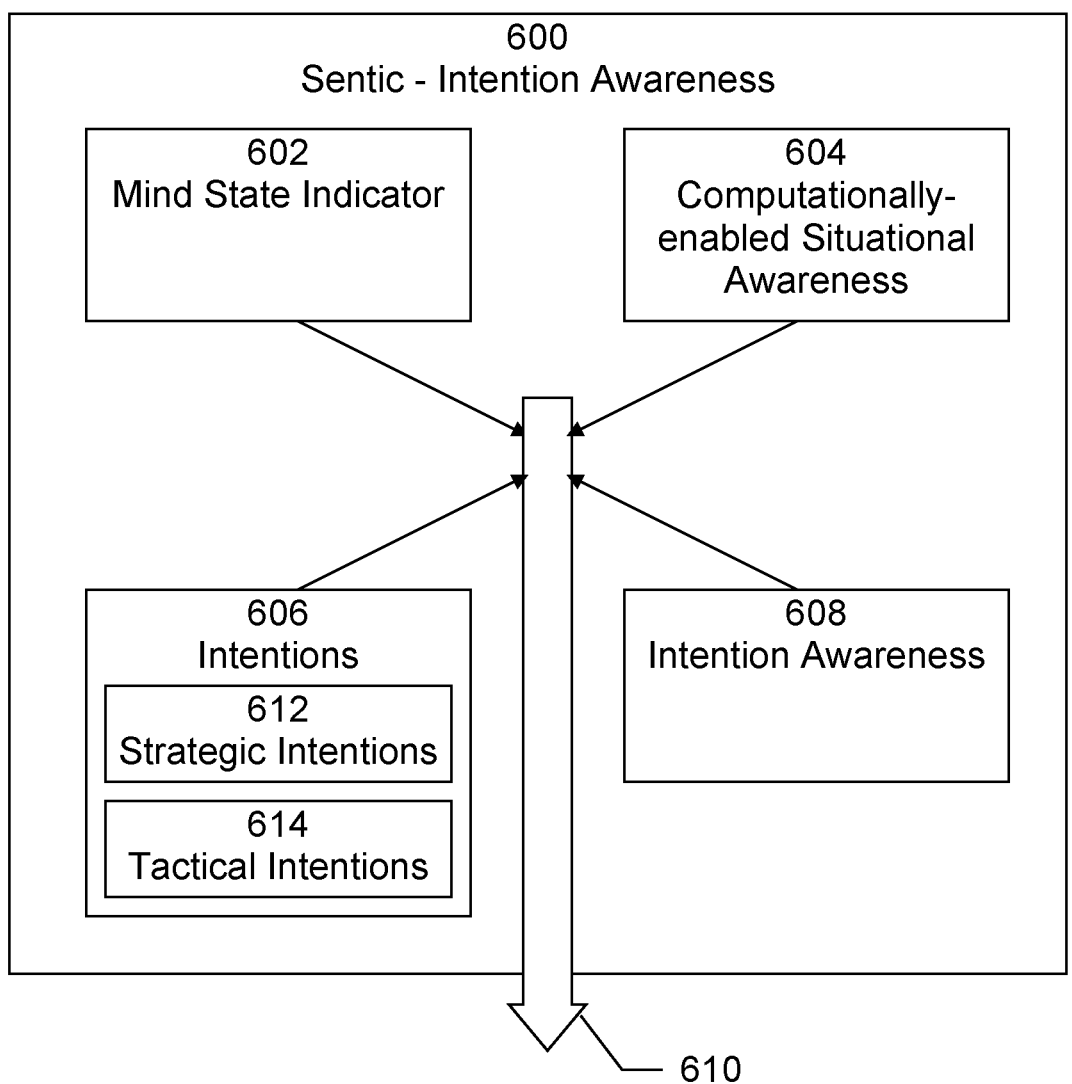
FIG. 6 is an exemplary block diagram of processing modules according to an embodiment of the present invention.

As shown in the example in FIG. 6, Sentic-IA 600 may include four modules 602, 604, 606, 608, six sets of input, and output data streams 610 formatted depending on the clinical or analytical needs that govern the application. Each of the modules corresponds to a hardware device specifically tailored to each subtask in the Sentic-IA routine. The first module is the Mind State Indicator (MSI) 602, which itself includes several sub-modules including data collection and analysis components. MSI 602 depends on voice, behavior, and written word data, so it is configurable to receive audio and raw instrument data as well (to include keyboard and behavior-monitoring instrumentation as well, such as multimodal Body Sensor Networks). The MSI algorithm itself explores the mapping of specific words and word contexts to "mind states," or cognitive dispositions influenced by emotions, situational stimuli, and pre-existing personality type. Mind states are transient as they depend for the most part on ever-changing variables, so this module's routine continues in a non-terminating loop until the analysis is complete.

In order to paint a clear picture of a patient's current state of mind, the analyst must examine their selection of words, their value, and the context in which they were used. In this sense, predictive linguistics is proactive instead of simply descriptive. Since language is the primary outward manifestation of our intentions (Howard, 2006) focusing our analysis on such attributes as these promises unprecedented real-time analysis of patient mind state that can then be used to identify brain disorders and proper treatments. A patient's conceptual expressions, both verbal and written, highlight underlying positive or negative language values over time, yielding a more accurate mind state analysis as time progresses (Giudere & Howard, 2011).

Computationally-enabled Situational Awareness 604. The situation assessment processes that comprises part of SA is an intensive cognitive process that serves as a junction between the physical properties of objects (position, heading, etc.) and the human mind's portrayal of those objects. In order to successfully complete this process, the actor conducting situational assessment must be able to properly account for the intentions of the other actors that share the same situation. This is a shortcoming in many contemporary SA models, which give less priority to intentionality as a driver of human-dominant situations. Due to the inherent structural differences in situational data and intentional information, not all systems that address the latter can also address the former, which produces a significant implementation gap despite the conceptual and potential application overlap between SA and IA.

Intentions 606. Intentions are always realized through a plan-for-action that directly guides behavior. The intention's logical and spatial container includes this plan of action. Once troops are engaged in battle various knowledge layers of a plan-for-action may require change, alteration, or omission, while the intention will remain an invariant. In a Plan-System intention invariants manifest themselves in two distinctly different forms:

Strategic Intentions 612. Invariant in nature; Strategic Intentions specify the ultimate desired end-state condition of the mission overall and provide guidance and reference from which individuals construct their own tactical intentions. They provide a long-term invariant construct.

Tactical Intentions 614. Variant in nature, Tactical Intentions specify a single step in the process towards realization of the Strategic Intention; more ephemeral in content, Tactical Intentions occur on a localized scale and are edited or omitted as necessary during mission execution.

Strategic Intentions are directly deduced from the Commander's Intent and provide conceptualization of the end-state of the mission in general for all the actors involved in the mission. It is through the execution of smaller, more short-term and localized Tactical Intentions that the overall Strategic Intention is realized. Differentiating between these two types of intention is necessary in light of a potentially different plan-for-action, which will realize the same Strategic Intention.

Strategic and Tactical Intentions relate to one another in an atomic formation. In the context of military organizations, CI travels through time and space within a combat order. As the primary invariant factor of a combat order, the CI therefore indicates a Strategic Intention. A variant knowledge layer of a combat order, the plan-for-action comprises the Concept of Operation, maneuvers, movements, objectives, fires, tasks, etc. The plan-for-action system thus indicates an atomic structure consisting of 1) a Strategic Intention and 2) transformations or relations of Tactical Intentions.

Intention Awareness 608. IA includes many of the basic principles of situation awareness (SA), such as consistent tracking and extrapolation of objects in the user's environment, but also exploits circumstantial semantics and Sentics [1], that is, the conceptual and affective information associated with objects and actors of the operating environment. Consider the everyday example discussed below.

Everyday tasks, from handling fragile objects to navigating a highway to parking one's car at work, require a high degree of situational awareness and spatial aptitude. Tasks such as these require the human actor to quickly adapt to new stationary and moving objects, as well as unpredictable moves that they may make, such as a pedestrian suddenly crossing the road. In the case of parking the car, the driver must account for the overall distribution of objects in the space of the parking lot at the time he plans to park the car, as well as the actions those objects may take based on the intentions of other human actors, hence the Parking Dilemma [2].

In order to properly understand and predict the actions of others in this space, the driver must predict what others will do, or their actions will otherwise appear random. For instance, a car may suddenly change course to move to a parking spot, which a driver considering the intentions of other drivers is more likely to detect and account for in his subsequent driving maneuvers.

Sentic Neurons-Existing approaches to opinion mining can be grouped into three main categories, with few exceptions: keyword spotting, lexical affinity, and statistical methods. Keyword spotting is the most naive approach and probably also the most popular because of its accessibility and economy. Text is classified into affect categories based on the presence of fairly unambiguous affect words like 'happy', 'sad', 'afraid', and 'bored'. Elliott's Affective Reasoner [4], for example, watches for 198 affect keywords, e.g., 'distressed' and 'enraged', plus affect intensity modifiers, e.g., 'extremely', 'somewhat', and 'mildly', plus a handful of cue phrases, e.g., 'did that' and 'wanted to'. Other popular sources of affect words are Ortony's Affective Lexicon [5], which groups terms into affective categories, and Wiebe's linguistic annotation scheme [6]. The weaknesses of this approach lie in two areas: poor recognition of affect when negation is involved and reliance on surface features. About its first weakness, while the approach can correctly classify the sentence "today was a happy day" as being happy, it is likely to fail on a sentence like "today wasn't a happy day at all". About its second weakness, the approach relies on the presence of obvious affect words which are only surface features of the prose. In practice, a lot of sentences convey affect through underlying meaning rather than affect adjectives. For example, the text "My husband just filed for divorce and he wants to take custody of my children away from me" certainly evokes strong emotions, but uses no affect keywords, and therefore, cannot be classified using a keyword spotting approach.

Lexical affinity is slightly more sophisticated than keyword spotting as, rather than simply detecting obvious affect words; it assigns arbitrary words a probabilistic 'affinity' for a particular emotion. For example, 'accident' might be assigned a 75% probability of being indicating a negative affect, as in 'car accident' or 'hurt by accident'. These probabilities are usually trained from linguistic corpora. Though often outperforming pure keyword spotting, there are two main problems with the approach. First, lexical affinity, operating solely on the word-level, can easily be tricked by sentences like "I avoided an accident" (negation) and "I met my girlfriend by accident" (other word senses). Second, lexical affinity probabilities are often biased toward text of a particular genre, dictated by the source of the linguistic corpora. This makes it difficult to develop a reusable, domain-independent model.

Statistical methods, such as latent semantic analysis (LSA) and support vector machine (SVM), have been popular for affect classification of texts and have been used by researchers on projects such as Goertzel's Webmind [11], Pang's movie review classifier, and many others. By feeding a machine learning algorithm a large training corpus of affectively annotated texts, it is possible for the systems to not only learn the affective valence of affect keywords as in the keyword spotting approach, but such a system can also take into account the valence of other arbitrary keywords (like lexical affinity), punctuation, and word co-occurrence frequencies. However, statistical methods are generally semantically weak, meaning that, with the exception of obvious affect keywords, other lexical or co-occurrence elements in a statistical model have little predictive value individually. As a result, statistical text classifiers only work with acceptable accuracy when given a sufficiently large text input. So, while these methods may be able to affectively classify user's text on the page or paragraph level, they do not work well on smaller text units such as sentences.

Our proposed alternative approach aims to focus on emulating the human reasoning process. The motivation is to enable machines to represent knowledge and perform reasoning in many different ways so that, whenever they reach a dead end, they can switch among different points of view and find one that may work. To bridge the cognitive and affective gap between 'word-level' natural language data and the 'concept-level' opinions and sentiments conveyed by them, we need more intelligent cognitive systems able to learn new affective common sense knowledge and perform reasoning on it [18].

While cars and other motor vehicles possess functions, such as turn signals, to assist in the conveyance of the driver's intention to other drivers, there still remains a significant gap between a driver's intentions and other drivers' awareness of them. Due to finite time and resources, routine activities such as this require integrating not only Situational Awareness, but Intention Awareness, in order to optimize the exchange of those resources for some other reward, in the above example a parking space.

Sentic Neurons IA: producing a superior picture of individual intentions and mind state—This invention combines the concepts of Intention Awareness and Sentic computing as a means of improving the efficiency of human-machine interfaces, as well as improving current predictive analysis technologies to better account for human actors' motives and rationales for behavior. Fundamentally speaking, Sentic computing is a multi-disciplinary methodology for mining data on people's opinions and sentiments, and then analyzing them. Sentic computing uses AI and Semantic Web techniques to represent knowledge, graph mining to reduce problem dimensions, linguistics for discourse analysis and psychology for cognitive and affective analysis, among other fields that vary according to the nature of the problem. Sentic computing is specifically oriented to web applications, which are inherently data rich, but this invention incorporates several components of mind state analysis that focus on the individual's cognitive state.

The analysis of natural language is based on affective ontologies and common sense reasoning tools, which enable the analysis of text not only at document-, page- or paragraph-level, but also at sentence-, clause-, and concept-level. In particular, Sentic computing involves the use of AI and Semantic Web techniques, for knowledge representation and inference; mathematics, for carrying out tasks such as graph mining and multi-dimensionality reduction; linguistics, for discourse analysis and pragmatics; psychology, for cognitive and affective modeling; sociology, for understanding social network dynamics and social influence; finally ethics, for understanding related issues about the nature of mind and the creation of emotional machines.

Figure 7:
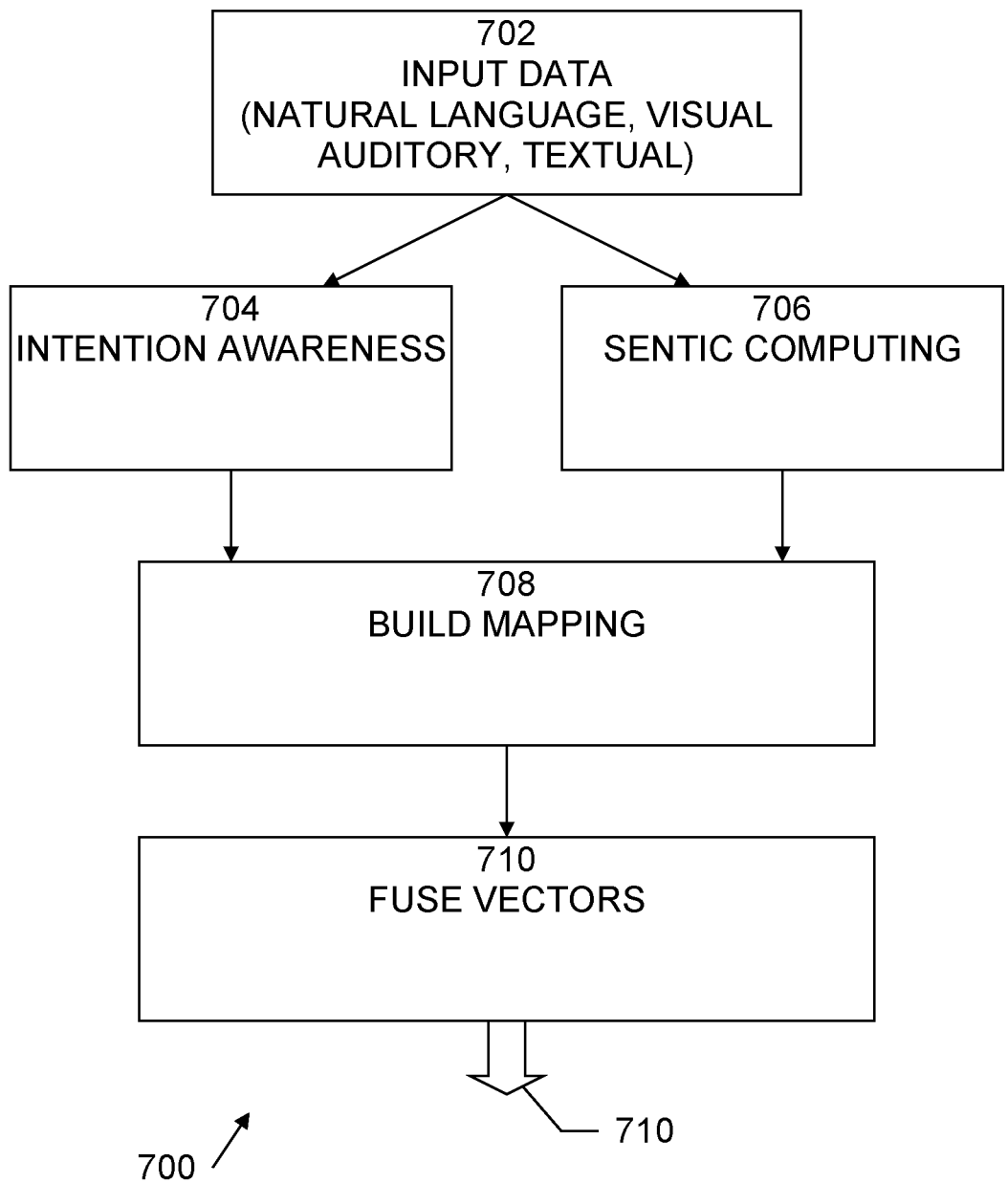
FIG. 7 is an exemplary flow diagram of a process according to an embodiment of the present invention.

In order to successfully combine the IA and Sentic computing concepts into an analytical template that is amenable to computational analysis, data streams associated with each must be "blended" in a useful manner. An exemplary flow diagram of a process 700 according to an embodiment of the present invention is shown in FIG. 7. Process 700 begins with 702, in which input data streams, which may include, for example, natural language, visual, auditory and textual data, and others, are received. At 704, at least of portion of the input data stream may be processed by IA 704 and by Sentic Computing 706.

To that end, Sentic blending proposes a methodology for fusing multiple unimodal signals in order to obtain a global multidimensional dynamic stream that shows how semantics and Sentics evolve over time. Capturing these changes over time is critical to the mission of Sentic-IA, which seeks to enhance existing implementations of IA by accounting for longer-term, subtle personality traits that do not change as often as mind state.

At 708, a mapping may be built such that the output of each module at a given time can be represented as, for example, a 100-dimensional coordinate vector. The components of the coordinate's vector are then calculated as the barycenter of those weighted points. Hence, the user's cognitive and affective progress can be viewed as a point (corresponding to the location of a particular state in time t) moving through this space over time.

At 710, the ensemble stream 712 may be computed by fusing the different vectors obtained from each modality over time. The main difficulty in achieving multimodal fusion is related to the fact that t0i stimulus arrival times may be known a-priori or not, and may be very different for each module.

The data obtained and used for these blending processes include visual, auditory, and textual data. In the case of visual data, facial expressions can be used to determine sentiments, and tendencies over time can be used to enhance personality analysis. Sentic-IA uses a facial analysis engine that achieves an automatic classification of the shown facial expressions into discrete emotional categories. It is able to classify the user's emotion in terms of Ekman's six universal emotions (fear, sadness, joy, disgust, surprise, and anger) plus neutral, giving a membership confidence value to each emotional category. The face modeling selected as input for the facial expression analyzer follows a feature-based approach: the inputs are a set of facial distances and angles calculated from feature points of the mouth, eyebrows, and eyes. The system intelligently combines the outputs of five different classifiers simultaneously. In this way, the overall risk of making a poor selection with a given classifier for a given input is reduced.

Figure 8:
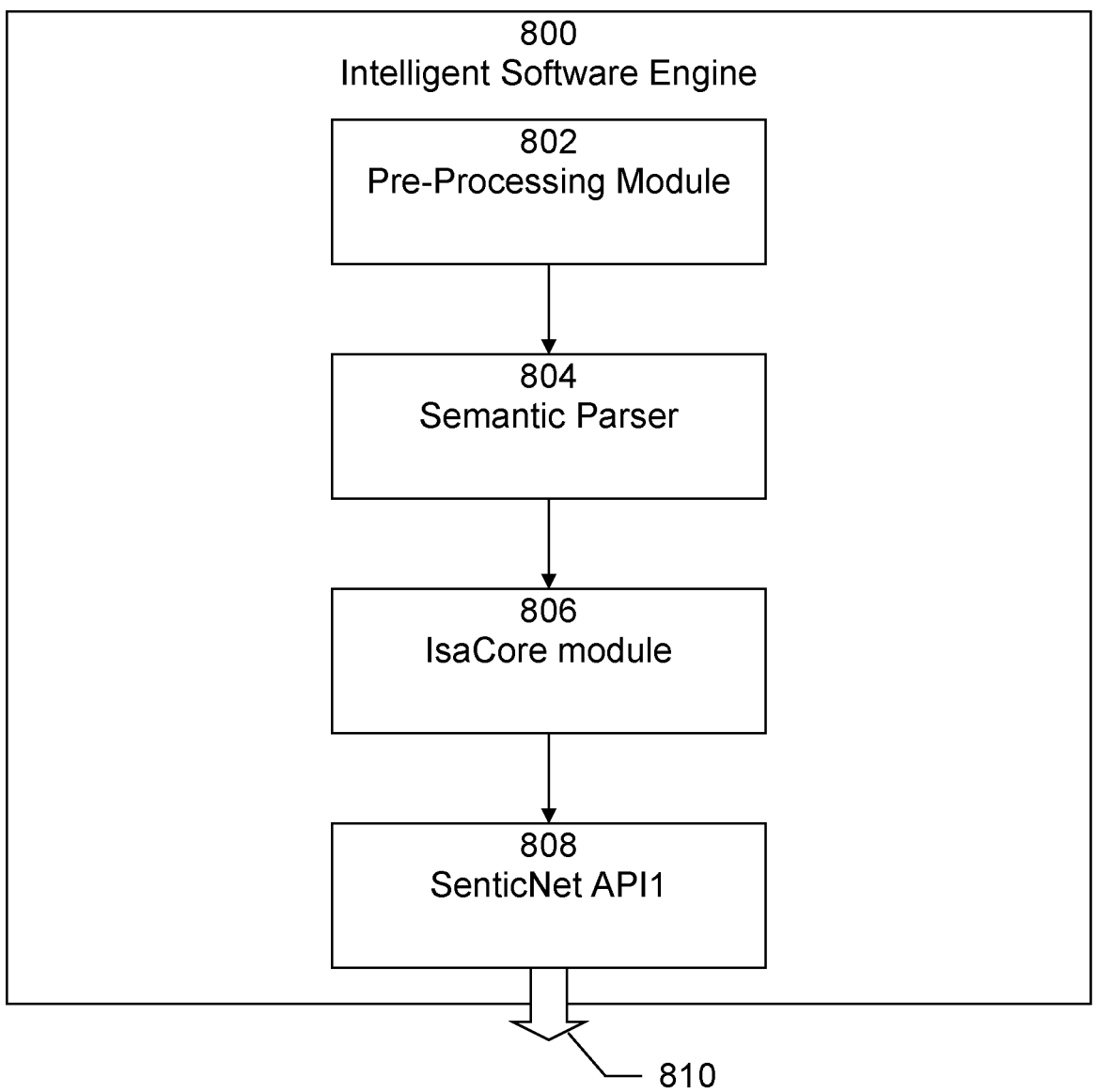
FIG. 8 is an exemplary block diagram of an intelligent software engine according to an embodiment of the present invention.

In the case of textual data, we have found that in order to effectively mine semantics and Sentics from text, it is necessary to bridge the gap between unstructured natural language data and structured machine-processable data. To this end, an intelligent software engine 800, an example of which is shown in FIG. 8, that may be based on SenticNet has been proposed that aims to extract the conceptual and affective information associated with natural language text. Intelligent software engine 800 may include four main components: a pre-processing module 802, which performs a first skim of the input text; a semantic parser 804, whose aim is to extract concepts from natural language data; the IsaCore module 806, for inferring the semantics associated with the given concepts; and the SenticNet API1 808, for the extraction of Sentics 810.

In prior research into personality types using the Facebook corpus, we found that Some Parts of Speech were significantly correlated with personality traits, including Extraversion.

ConceptNet and SenticNet produced a list of ~3600 concepts that occurred frequently in the Facebook Corpus. About ~150 correlated extremely highly with Extraversion, and some of the SenticNet vectors demonstrated significant correlations with individual traits, including Extraversion. The algorithm we developed showed an increased accuracy in the detection of extraversion and conscientiousness based on the ability to read text from Facebook posts and information.

Figure 9:
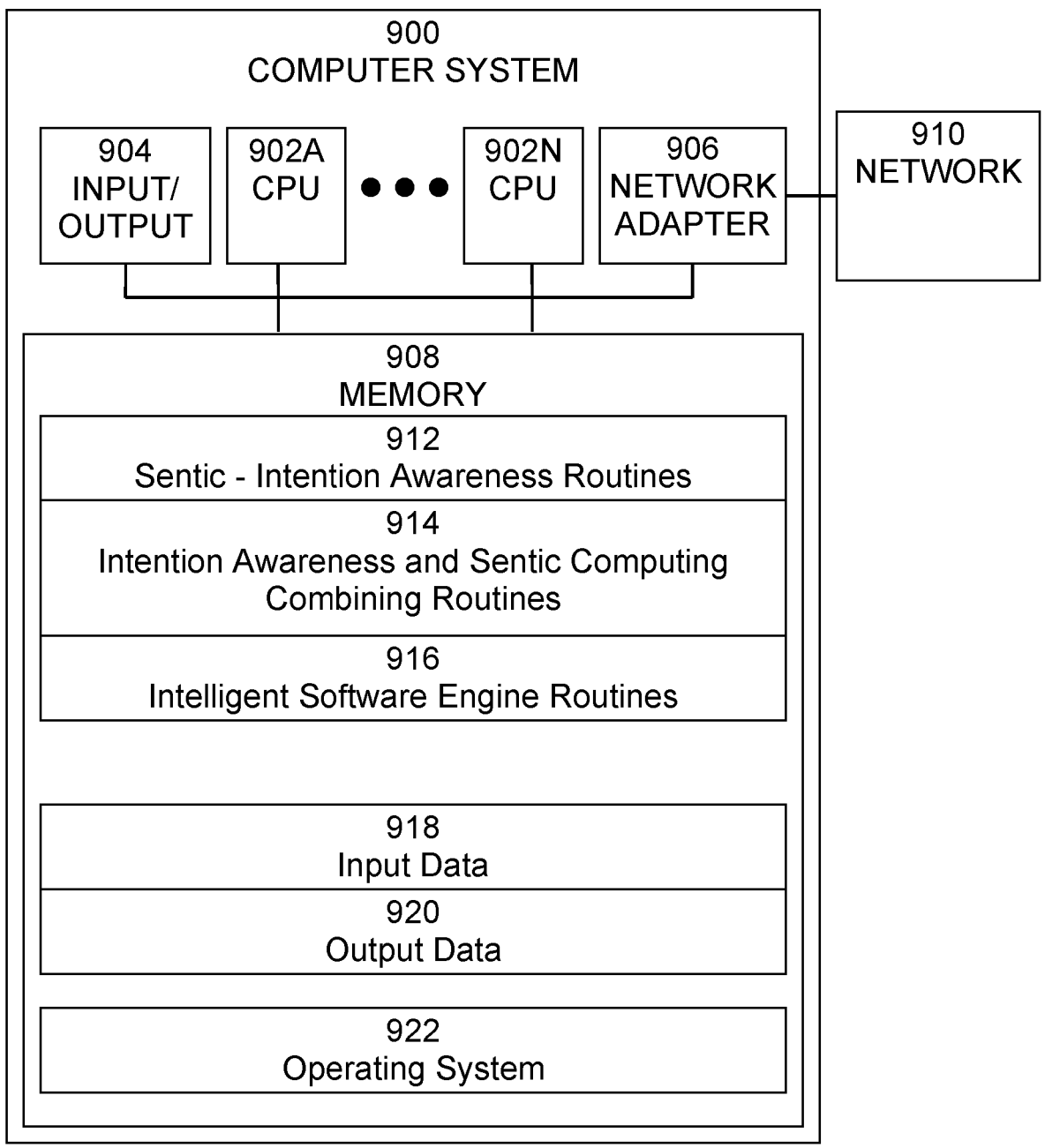
FIG. 9 is an exemplary block diagram of a computer system in which processes involved in the embodiments described herein may be implemented.

An exemplary block diagram of a computer system 900, in which processes involved in the embodiments described herein may be implemented, is shown in FIG. 9. Computer system 900 is typically a programmed general-purpose computer system, such as an embedded processor, system on a chip, personal computer, workstation, server system, and minicomputer or mainframe computer. Computer system 900 may include one or more processors (CPUs) 902A-902N, input/output circuitry 904, network adapter 906, and memory 908. CPUs 902A-902N execute program instructions in order to carry out the functions of the present invention. Typically, CPUs 902A-902N are one or more microprocessors, such as an INTEL PENTIUM® processor. FIG. 9 illustrates an embodiment in which computer system 900 is implemented as a single multi-processor computer system, in which multiple processors 902A-902N share system resources, such as memory 908, input/output circuitry 904, and network adapter 906. However, the present invention also contemplates embodiments in which computer system 900 is implemented as a plurality of networked computer systems, which may be single-processor computer systems, multi-processor computer systems, or a mix thereof.

Input/output circuitry 904 provides the capability to input data to, or output data from, computer system 900. For example, input/output circuitry may include input devices, such as keyboards, mice, touchpads, trackballs, scanners, etc., output devices, such as video adapters, monitors, printers, etc., and input/output devices, such as, modems, etc. Network adapter 906 interfaces device 900 with a network 910. Network 910 may be any public or proprietary LAN or WAN, including, but not limited to the Internet.

Memory 908 stores program instructions that are executed by, and data that are used and processed by, CPU 902 to perform the functions of computer system 900. Memory 908 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 908 may vary depending upon the function that computer system 900 is programmed to perform. For example, as shown in FIG. 6, computer systems may perform a variety of roles in the system, method, and computer program product described herein. For example, computer systems may perform one or more roles as end devices, gateways/base stations, application provider servers, and network servers. In the example shown in FIG. 9, exemplary memory contents are shown representing routines and data for all of these roles. However, one of skill in the art would recognize that these routines, along with the memory contents related to those routines, may not typically be included on one system or device, but rather are typically distributed among a plurality of systems or devices, based on well-known engineering considerations. The present invention contemplates any and all such arrangements.

In the example shown in FIG. 9, memory 908 may include Sentic-Intention Awareness routines 912, Intention Awareness and Sentic Computing Combining routines 914, Intelligent Software Engine routines 916, input data 918, output data 920, and operating system 922. For example, Sentic-Intention Awareness routines 912 may include routines to operate the hardware devices specifically tailored to each subtask in the Sentic-Intention Awareness shown in FIG. 6. Intention Awareness and Sentic Computing Combining 914 may include routines to combine the IA and Sentic computing concepts into an analytical template that is amenable to computational analysis by blending data streams or input data 918 associated with each and to output data 920, as shown in FIG. 7. Intelligent Software Engine routines 916 may include routines to implement an intelligent software engine, as shown in FIG. 8. Operating system 922 provides overall system functionality.

As shown in FIG. 9, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method implemented in a computer system comprising a processor, memory accessible by the processor, and computer program instructions stored in the memory and executable by the processor, the method comprising:
   receiving, at the computer system, data relating to a plurality of aspects of at least one person, including data from at least one of physical or physiological sensors and communicatively connected devices;
   extracting, at the computer system, from the received data, features relevant to events relating to at least one person using a models processor adapted to select and process models for feature extraction;
   extracting, at the computer system, at least one intent of at least one event relating to at least one person using an intent extractor adapted to use ensemble models to process and integrate persona data, ontology data from an ontology database comprising user domain data, intent domain data, context domain data, and world data, and extracted features, wherein the ensemble models are selected to find an optimal stack of predictors, and wherein extracting the at least one intent comprises performing intention awareness processing to form multidimensional intention awareness vectors and determining a component of at least one multidimensional intention awareness vector as a barycenter of the weighted points of the vector, including consistent tracking and extrapolation of objects in an environment and circumstantial semantics, forming multidimensional intention vectors and determining a component of at least one multidimensional intention vector as a barycenter of the weighted points of the vector, and generating an ensemble datastream representing the extracted at least one intent by fusing the intention awareness vectors and the intention vectors; and
   performing, at the computer system, an action based on the extracted at least one intent.

2. The method of claim 1, wherein the data relating to a plurality of aspects of at least one person comprises live data retrieved from a plurality of capture points that at least one person is exposed to and interacts with;
   the communicatively connected device comprises at least one of a microphone, room camera, fridge camera, smart mobile, smart refrigerator, smart watch, smart fire alarm, smart door lock, smart bicycle, medical sensor, fitness tracker, smart security system, voice controller, dash button, doorbell cam, mobile robot, smart light switch, and air quality monitor;
   the physical and physiological sensor comprises at least one of an audio sensor, video sensor, electro-encephalogram sensor, electro-cardiogram sensor, heart rate sensor, breathing rate sensor, blood pressure sensor, body temperature sensor, head movement sensor, body posture sensor, and blood oxygenation level sensor, humidity sensor, biometric sensor; and
   the data further comprises at least one of browsing history, bookmarks, browsing behavior, time spent on particular web pages, location history, calendar with past and upcoming events, social media activity, posts, social network graph, text, audio, video, social media content, chat, Short Message Service (SMS), email, medical visits, current diseases, medical treatments, real-time movements, breathing, cardiac frequency, and sleep patterns.

3. The method of claim 2, wherein the features relevant to events relating to at least one person are extracted using artificial intelligence and machine learning models trained using data relating to a plurality of aspects of at least one person, wherein data relating to actions that are highly-specific predictors for particular intents are tagged.

4. The method of claim 3, wherein at least one intent of at least one event relating to at least one person is extracted using ontologies data relating to subject areas that shows the properties and the relations between the subject area; and
   ontologies methodology is used to create a supporting framework for intention query by defining concepts, sub-concepts, relationships, and aggregations of multiple concepts.

5. The method of claim 4, wherein the physical action comprises at least one of generating an alarm, providing information or suggestions, and providing narrativization of events.

6. A system comprising a processor, memory accessible by the processor, and computer program instructions stored in the memory and executable by the processor to perform:
   receiving data relating to a plurality of aspects of at least one person, including data from at least one of physical or physiological sensors and communicatively connected devices;
   extracting from the received data, features relevant to events relating to at least one person using a models processor adapted to select and process models for feature extraction, the processed models including at least ensemble models;
   extracting, at the computer system, at least one intent of at least one event relating to at least one person using an intent extractor adapted to use ensemble models to process and integrate persona data, ontology data from an ontology database comprising user domain data, intent domain data, context domain data, and world data, and extracted features, wherein the ensemble models are selected to find an optimal stack of predictors, and wherein extracting the at least one intent comprises performing intention awareness processing to form multidimensional intention awareness vectors and determining a component of at least one multidimensional intention awareness vector as a barycenter of the weighted points of the vector, including consistent tracking and extrapolation of objects in an environment and circumstantial semantics, forming multidimensional intention vectors and determining a component of at least one multidimensional intention vector as a barycenter of the weighted points of the vector, and generating an ensemble datastream representing the extracted at least one intent by fusing the intention awareness vectors and the intention vectors; and performing an action based on the extracted at least one intent.

7. The system of claim 6, wherein the data relating to a plurality of aspects of at least one person comprises live data retrieved from a plurality of capture points that at least one person is exposed to and interacts with;

the communicatively connected device comprises at least one of a microphone, room camera, fridge camera, smart mobile, smart refrigerator, smart watch, smart fire alarm, smart door lock, smart bicycle, medical sensor, fitness tracker, smart security system, voice controller, dash button, doorbell cam, mobile robot, smart light switch, and air quality monitor;

the physical and physiological sensor comprises at least one of an audio sensor, video sensor, electro-encephalogram sensor, electro-cardiogram sensor, heart rate sensor, breathing rate sensor, blood pressure sensor, body temperature sensor, head movement sensor, body posture sensor, and blood oxygenation level sensor, humidity sensor, biometric sensor; and the data further comprises at least one of browsing history, bookmarks, browsing behavior, time spent on particular web pages, location history, calendar with past and upcoming events, social media activity, posts, social network graph, text, audio, video, social media content, chat, Short Message Service (SMS), email, medical visits, current diseases, medical treatments, real-time movements, breathing, cardiac frequency, and sleep patterns.

8. The system of claim 7, wherein the features relevant to events relating to at least one person are extracted using artificial intelligence and machine learning models trained using data relating to a plurality of aspects of at least one person, wherein data relating to actions that are highly-specific predictors for particular intents are tagged.

9. The system of claim 8, wherein at least one intent of at least one event relating to at least one person is extracted using ontologies data relating to subject areas that shows the properties and the relations between the subject area; and ontologies methodology is used to create a supporting framework for intention query by defining concepts, sub-concepts, relationships, and aggregations of multiple concepts.

10. The method of claim 9, wherein the physical action comprises at least one of generating an alarm, providing information or suggestions, and providing narrativization of events.

11. A computer program product comprising a non-transitory computer readable storage having program instructions embodied therewith, the program instructions executable by a computer, to cause the computer to perform a method comprising:

receiving, at the computer system, data relating to a plurality of aspects of at least one person, including data from at least one of physical or physiological sensors and communicatively connected devices;

extracting, at the computer system, from the received data, features relevant to events relating to at least one person using a models processor adapted to select and process models for feature extraction, the processed models including at least ensemble models;

extracting, at the computer system, at least one intent of at least one event relating to at least one person using an intent extractor adapted to use ensemble models to process and integrate persona data, ontology data from an ontology database comprising user domain data, intent domain data, context domain data, and world data, and extracted features, wherein the ensemble models are selected to find an optimal stack of predictors, wherein extracting the at least one intent comprises performing intention awareness processing to form multidimensional intention awareness vectors and determining a component of at least one multidimensional intention awareness vector as a barycenter of the weighted points of the vector, including consistent tracking and extrapolation of objects in an environment and circumstantial semantics, forming multidimensional intention vectors and determining a component of at least one multidimensional intention vector as a barycenter of the weighted points of the vector, and generating an ensemble datastream representing the extracted at least one intent by fusing the intention awareness vectors and the intention vectors; and performing, at the computer system, an action based on the extracted at least one intent.

12. The computer program product of claim 11, wherein the data relating to a plurality of aspects of at least one person comprises live data retrieved from a plurality of capture points that at least one person is exposed to and interacts with;

the communicatively connected device comprises at least one of a microphone, room camera, fridge camera, smart mobile, smart refrigerator, smart watch, smart fire alarm, smart door lock, smart bicycle, medical sensor, fitness tracker, smart security system, voice controller, dash button, doorbell cam, mobile robot, smart light switch, and air quality monitor;

the physical and physiological sensor comprises at least one of an audio sensor, video sensor, electro-encephalogram sensor, electro-cardiogram sensor, heart rate sensor, breathing rate sensor, blood pressure sensor, body temperature sensor, head movement sensor, body posture sensor, and blood oxygenation level sensor, humidity sensor, biometric sensor; and the data further comprises at least one of browsing history, bookmarks, browsing behavior, time spent on particular web pages, location history, calendar with past and upcoming events, social media activity, posts, social network graph, text, audio, video, social media content, chat, Short Message Service (SMS), email, medical visits, current diseases, medical treatments, real-time movements, breathing, cardiac frequency, and sleep patterns.

13. The computer program product of claim 12, wherein the features relevant to events relating to at least one person are extracted using artificial intelligence and machine learning models trained using data relating to a plurality of aspects of at least one person, wherein data relating to actions that are highly-specific predictors for particular intents are tagged.

14. The computer program product of claim 13, wherein at least one intent of at least one event relating to at least one person is extracted using ontologies data relating to subject areas that shows the properties and the relations between the subject area; and ontologies methodology is used to create a supporting framework for intention query by defining concepts, sub-concepts, relationships, and aggregations of multiple concepts.

15. The computer program product of claim 14, wherein the physical action comprises at least one of generating an alarm, providing information or suggestions, and providing narrativization of events.

* * * * *